United States Patent [19]

Saka et al.

[11] Patent Number: 5,396,432
[45] Date of Patent: Mar. 7, 1995

[54] VERSATILE PRODUCTION SYSTEM AND METHOD OF OPERATING SAME

[75] Inventors: Nobuo Saka; Junichi Oda; Kazuyuki Kajihara; Yasuaki Ishiyama, all of Ishikawa, Japan

[73] Assignee: PFU Limited, Ishikawa, Japan

[21] Appl. No.: 26,046

[22] Filed: Mar. 4, 1993

[30] Foreign Application Priority Data

Nov. 30, 1992 [JP] Japan ................. 4-319795
Nov. 30, 1992 [JP] Japan ................. 4-319798

[51] Int. Cl.$^6$ .............................. G06F 15/46
[52] U.S. Cl. ................... 364/468; 364/401; 364/552
[58] Field of Search ........... 364/468, 478, 401, 402, 364/403, 552, 550.01, 550, 474.11, 131–134, 138; 235/375, 385; 395/926

[56] References Cited

U.S. PATENT DOCUMENTS

| | | | |
|---|---|---|---|
| 4,974,166 | 11/1990 | Maney et al. | 364/468 X |
| 5,025,384 | 6/1991 | Teranishi et al. | 364/468 X |
| 5,134,574 | 7/1992 | Beaverstock et al. | 364/552 X |
| 5,140,537 | 8/1992 | Tullis | 364/401 X |
| 5,150,288 | 9/1992 | Imai et al. | 364/132 |
| 5,172,313 | 12/1992 | Schumacher | 364/401 |
| 5,241,482 | 8/1993 | Iida et al. | 364/552 X |
| 5,245,554 | 9/1993 | Tsuyama et al. | 364/401 X |
| 5,268,849 | 12/1993 | Howlett et al. | 364/468 X |

FOREIGN PATENT DOCUMENTS

| | | |
|---|---|---|
| 0417297 | 3/1991 | European Pat. Off. |
| 0448327 | 9/1991 | European Pat. Off. |
| 2194086 | 2/1988 | United Kingdom |
| 2219109 | 11/1989 | United Kingdom |

OTHER PUBLICATIONS

H. Itoh and I. Sakamoto, "Special Edition: Total Production Information System–CIM–Commitment to CIM in PFU Kasajima Works," Fujitsu Journal No. 197, Vol. 18, No. 4, 1992, pp. 60–69. (An English Language Translation is Attached.).

L. E. Holloway, et al., IEEE, "Integration of Behavioral Fault-detection Models and An Intelligent Reactive Scheduler", Aug. 1991, pp. 134–139.

K. Brankramp, ZWF Zeitschrift Fur Wirtschaftliche Fertigung Und Automatisierung, "Der Werker Im Mittelpunkt", Oct. 1992, vol. 87, No. 10, pp. 571–573.

Shari L. S. Worthington, Proceedings of the Industrial Computing Conference, "The Personalization of Manufacturing: Redefining the Human Interface", Oct. 1991, vol. 1, 27–31, pp. 421–434.

Shi-Chung Chang, et al., IEEE, "Scheduling Flexible Flow Shops With No Setup Effects", May 1992, pp. 1179–1184.

Primary Examiner—Joseph Ruggiero
Attorney, Agent, or Firm—Staas & Halsey

[57] ABSTRACT

The present invention relates to a versatile production system and a method of operating same. The system generates a work order so as to improve production efficiency and minimize line balance loss. The system includes working places for assembling and testing various kinds of products and line terminals installed in the working places. A communication-memory unit is attached to a product or a pallet so as to match the flow of products and information. A line host controller stores files containing information related to work contents, operators, time changes, standard parts feeding sequence, components of a product and maintenance tool. The line host controller calculates and assigns work so as to reduce the inefficient use of time and outputs work orders via the line terminals. The system monitors parameters related to time control, quality conditions and the states of operators. The system rearranges work orders and stops the system if a critical fault occurs.

22 Claims, 22 Drawing Sheets

Fig. 6

| PROCESS | $n=21$ $m=3$ | GROUP SUM | MULTIPLY RATINGS | ASSIGN IMAGINARY PROCESS |
|---|---|---|---|---|
| PROCESS M1 RATING $R_1=110$ | $X_1=15$ $X_2=12$ $X_3=8$ $X_4=10$ $X_5=11$ $X_6=6$ | $A_1=62$ | $A_1*100/R_1=57$ | $A_1*100/R_1+X_{15}+X_{16}+X_{20}$ $=75$ |
| PROCESS M2 RATING $R_2=80$ | $X_7=18$ $X_8=11$ $X_9=20$ | $A_2=49$ | $A_2*100/R_2=62$ | $A_2*100/R_2+X_{18}+X_{21}=75$ |
| PROCESS M3 RATING $R_3=95$ | $X_{10}=23$ $X_{11}=7$ $X_{12}=6$ $X_{13}=17$ $X_{14}=10$ | $A_3=63$ | $A_3*100/R_3=67$ | $A_3*100/R_3+X_{17}+X_{19}=75$ |
| IMAGINARY PROCESS WORKS | $X_{15}=9$ $X_{16}=6$ $X_{17}=4$ $X_{18}=7$ $X_{19}=4$ $X_{20}=3$ $X_{21}=6$ | | | ⇧ LINE BALANCE LOSS MIN. |

| | | GROUP SUM | MULTIPLY RATINGS | ASSIGN IMAGINARY PROCESS |
|---|---|---|---|---|
| PROCESS M1 RATING $R_1 = 110$ | $n=21$ $m=3$ $X_1=15$ $X_2=12$ $X_3=8$ $X_4=10$ $X_5=11$ $X_6=6$ | $A_1 = 62$ | $A_1 * 100/R_1 = 57$ | $A_1 * 100/R_1 + X_{15} + X_{16} + X_{21}$ $=78$ |
| PROCESS M2 RATING $R_2 = 70$ | $X_7=18$ $X_8=11$ $X_9=20$ | $A_2 = 49$ | $A_2 * 100/R_2 = 70$ | $A_2 * 100/R_2 + X_{17} + X_{19} = 78$ |
| PROCESS M3 RATING $R_3 = 95$ | $X_{10}=23$ $X_{11}=7$ $X_{12}=6$ $X_{13}=17$ $X_{14}=10$ | $A_3 = 63$ | $A_3 * 100/R_3 = 67$ | $A_3 * 100/R_3 + X_{18} + X_{20} = 77$ |
| IMAGINARY PROCESS WORKS | $X_{15}=9$ $X_{16}=6$ $X_{17}=4$ $X_{18}=7$ $X_{19}=4$ $X_{20}=3$ $X_{21}=6$ | | | ⇧ LINE BALANCE LOSS MIN. |

| Fig. 8 |
|---|
| Fig. 8A |
| Fig. 8B |

WORK CONTENTS

| TYPE CODE | PRODUCT NAME | WORK NAME | WORK CONTENTS | ASMBL. CONTENTS PARTS NAME | PARTS FROM | Qtys | PREP. HRS PREP. | CLN HRS CLN | MAN-HRS | WORK SEQUENCE |
|---|---|---|---|---|---|---|---|---|---|---|
| 10451 | α | X 1 | Asmb BASE A | BASE A | WH B | 1 | 5 | 1 | 15 | 1 |
| | | X 2 | BOLT BASE A | M 3x6 | — | 3 | | | 12 | 2 |
| | | X 3 | LABEL N. P. | NP α | KIT | 1 | | | 8 | 3 |
| | | X 4 | MOUNT M.FITTINGS | MF A | WH B | 2 | 4 | 3 | 10 | 4 |
| | | X 5 | BOLT M.FITTINGS | M 3x4 | — | 1 | | | 11 | 5 |
| | | X 6 | MOUNT P.S. UNIT | P.S. UNIT | WH A | 2 | 4 | 1 | 6 | 6 |
| | | X 7 | BOLT P.S. UNIT | M3x10 | — | 3 | | | 18 | 7 |
| | | X 8 | MOUNT FDD | FDD | KIT | 2 | | | 11 | 8 |
| | | X 9 | BOLT FDD | M 3x10 | — | 1 | | | 20 | 9 |
| | | X 10 | MOUNT Pt PLATE | Pt UNIT | UNIT SHELF | 2 | | | 23 | 10 |
| | | X 11 | BOLT Pt PLATE | M 3x5 | — | | | | 7 | 11 |

Fig. 8B

| | β | | | | KIT | | | | | |
|---|---|---|---|---|---|---|---|---|---|---|
| 7 | | X12 | MOUNT HD UNIT | HD UNIT | KIT | 1 | | | 6 | 12 |
| 4 | | X13 | BOLT HD UNIT | M 3×12 | WH B | 2 | 2 | 4 | 7 | 13 |
| 3 | | X14 | MOUNT UP COVER | UP COVER | — | 3 | 3 | 2 | 10 | 14 |
| 2 | | X15 | BOLT | M 3×4 | — | 2 | | | 9 | 15 |
| 9 | | X16 | BOLT | M 3×7 | — | 1 | | | 6 | 16 |
| | | X17 | BOLT | M 3×3 | — | 1 | | | 4 | 17 |
| | | X18 | BOLT | M 3×6 | — | 1 | | | 7 | 18 |
| | | X19 | BOLT | M 3×7 | — | 1 | | | 4 | 16 |
| | | X20 | BOLT | M 3×3 | — | 1 | | | 3 | 17 |
| | | X21 | BOLT | M 3×6 | — | 1 | | | 6 | 18 |
| | | X22 | Asemb. BASE B | BASE B | WH B | 1 | 2 | 4 | 8 | 1 |
| | | X23 | BOLT BACE B | BASE B | — | 2 | | | 10 | 2 |
| | | X24 | MOUNT P.S. UNIT | P.S.UNIT | WH A | 1 | 1 | 2 | 5 | 3 |
| ⋯ | ⋯ | ⋯ | ⋯ | ⋯ | ⋯ | ⋯ | ⋯ | ⋯ | ⋯ | ⋯ |

Fig. 9A

| OPERATOR ID | NAME | RATING |
|---|---|---|
| 3 8 4 7 2 | ICHIRO KANAZAWA | 1 1 0 |
| 1 7 4 6 2 | HANAKO ISHIKAWA | 8 0 |

Fig. 9B

| HIGH EFFICIENCY WORKING TIME | |
|---|---|
| START | END |
| 1 0 : 0 0 | 1 1 : 0 0 |
| 1 5 : 0 0 | 1 6 : 0 0 |

Fig. 9C

| TYPE CODE | PRO. SEQ. NO. |
|---|---|
| 1 0 4 5 1 | 1 |
| 0 2 3 4 2 | 1 |
| 4 8 2 3 1 | 1 |
| 8 7 3 5 4 | 2 |
| 3 7 2 3 9 | 2 |
| 7 4 3 2 9 | 2 |
| 4 3 7 8 4 | 2 |
| 6 8 7 2 4 | 3 |
| 5 2 4 3 8 | 3 |
| 3 2 7 6 4 | 3 |
| 6 4 3 2 6 | 4 |
| 6 2 3 2 8 | 4 |

Fig. 10A

| MAINTENANCE TOOL | STOCK QTYS |
|---|---|
| A | 10 |
| B | 8 |
| C | 15 |

Fig. 10B

| NAME | TYPE CODE MAINTENANCE TOOL | QTYS |
|---|---|---|
| α | BASE A | 1 |
|   | BOLT M3×6 | 3 |
|   | N. M. α | 1 |
|   | METAL F.A | 1 |
|   | BOLT M3×4 | 2 |
|   | P.S. | 1 |
|   | BOLT M3×10 | 2 |
|   | FDD UNIT | 3 |
|   | BOLT M3×10 | 2 |
|   | Pt BOARD | 1 |
|   | BOLT M3×5 | 2 |
|   | HD UNIT | 1 |
|   | BOLT M3×12 | 2 |
|   | UP COVER | 3 |
|   | BOLT M3×4 | 2 |
|   | BOLT M3×7 | 1 |
|   | BOLT M3×3 | 1 |
|   | BOLT M3×6 | 1 |
|   | BOLT M3×7 | 1 |
|   | MAINTE TOOL A | 1 |

Fig. 10C

| START DATE | TYPE CODE | PRODUCT NAME | QTYS | SCHEDULED DATE |
|---|---|---|---|---|
| 10.06.92 | 1 0 4 5 1 | α | 10 | 10.08.92 |
| 10.06.92 | 7 4 3 2 9 | β | 6 | 10.07.92 |
| 10.06.92 | 6 4 3 2 6 | γ | 20 | 10.09.92 |

Fig. 11A

PROCESS BASE FILE

| PROCESS | PROD. NAME | QTYS | WORK START DATE & TIME | TACT PITCH | WORKS | | | | | | | |
|---|---|---|---|---|---|---|---|---|---|---|---|---|
| M 1 | α | 10 | 10.06.92/08:40 | 75 | $X_1$ | $X_2$ | $X_3$ | $X_4$ | $X_5$ | $X_6$ | $X_{15}$ | $X_{16}$ $X_{20}$ |
| M 2 | α | 10 | 10.06.92/08:42 | 75 | $X_7$ | $X_8$ | $X_9$ | $X_{18}$ | $X_{21}$ | | | |
| M 3 | α | 10 | 10.06.92/08:44 | 75 | $X_{10}$ | $X_{11}$ | $X_{12}$ | $X_{13}$ | $X_{14}$ | $X_{17}$ | $X_{19}$ | |
| ... | ... | ... | ... | ... | ... | ... | ... | ... | ... | ... | ... | ... |

Fig. 11B

SCHEDULE FILE

| WORK START DATE | TYPE & CODE | PRODUCT NAME | QTYS | PRODUCTION SEQUENCE NUMBER | WORK STARK TIME FOR M1 |
|---|---|---|---|---|---|
| 10.06.92 | 104511 | α | 10 | 1 | 08:40 |
| 10.06.92 | 743329 | β | 6 | 2 | 08:53 |
| 10.06.92 | 64326 | γ | 20 | 3 | 09:12 |

| | GROUP SUM | MULTIPLY RATINGS | ASSIGN IMAGINARY PROCESS |
|---|---|---|---|
| PROCESS M1 RATING $R_1 = 110$ | $X_1 = 15$<br>$X_2 = 12$<br>$X_3 = 8$<br>$X_4 = 10$<br>$X_5 = 11$<br>$X_6 = 6$<br>$A_1 = 62$ | $A_1 \; 100/R_1 = 57$ | $A_1 \times 100/R_1 + X_{15} + X_{16} + X_{20} = 75$ |
| PROCESS M2 RATING $R_2 = 80$ | $X_7 = 18$<br>$X_8 = 11$<br>$X_9 = 20$<br>$A_2 = 49$ | $A_2 \; 100/R_2 = 62$ | $A_2 \times 100/R_2 + X_{18} + X_{21} = 75$ |
| PROCESS M3 RATING $R_3 = 95$ | $X_{10} = 23$<br>$X_{11} = 7$<br>$X_{12} = 6$<br>$X_{13} = 17$<br>$X_{14} = 10$<br>$A_3 = 63$ | $A_3 \; 100/R_3 = 67$ | $A_3 \times 100/R_3 + X_{17} + X_{19} = 75$ |
| IMAGINARY PROCESS WORKS | $X_{15} = 9$<br>$X_{16} = 6$<br>$X_{17} = 4$<br>$X_{18} = 7$<br>$X_{19} = 4$<br>$X_{20} = 3$<br>$X_{21} = 6$ | | |

$X = 213$
Aim $= 71$

⇧ LINE BALANCE LOSS MIN.

| | GROUP SUM | MULTIPLY RATINGS | ASSIGN IMAGINARY PROCESS |
|---|---|---|---|
| PROCESS M1 RATING $R_1=110$ | $X_1=15$<br>$X_2=12$<br>$X_3=8$<br>$X_4=10$<br>$X_5=11$<br>$X_6=6$<br>$X_7=18$<br>$A_1=80$ | $A_1 \ 100/R_1=72.7$ | $72.7+X_{20}=75.7$ |
| PROCESS M2 RATING $R_2=80$ | $X_8=11$<br>$X_9=20$<br>$X_{10}=23$<br>$A_2=54$ | $A_2 \ 100/R_2=67.5$ | $67.5+X_{21}=73.5$ |
| PROCESS M3 RATING $R_3=95$ | $X_{11}=7$<br>$X_{12}=6$<br>$X_{13}=17$<br>$X_{14}=10$<br>$X_{15}=9$<br>$X_{16}=6$<br>$X_{17}=4$<br>$X_{18}=7$<br>$X_{19}=4$<br>$A_3=70$ | $A_3 \ 100/R_3=73.7$ | 73.7 |
| IMAGINARY PROCESS WORKS | $X_{20}=3$<br>$X_{21}=6$ | | |

$X=213$
$Ai_1=82.2$
$Ai_2=59.8$
$Ai_3=71$

⇧ LINE BALANCE LOSS MIN.

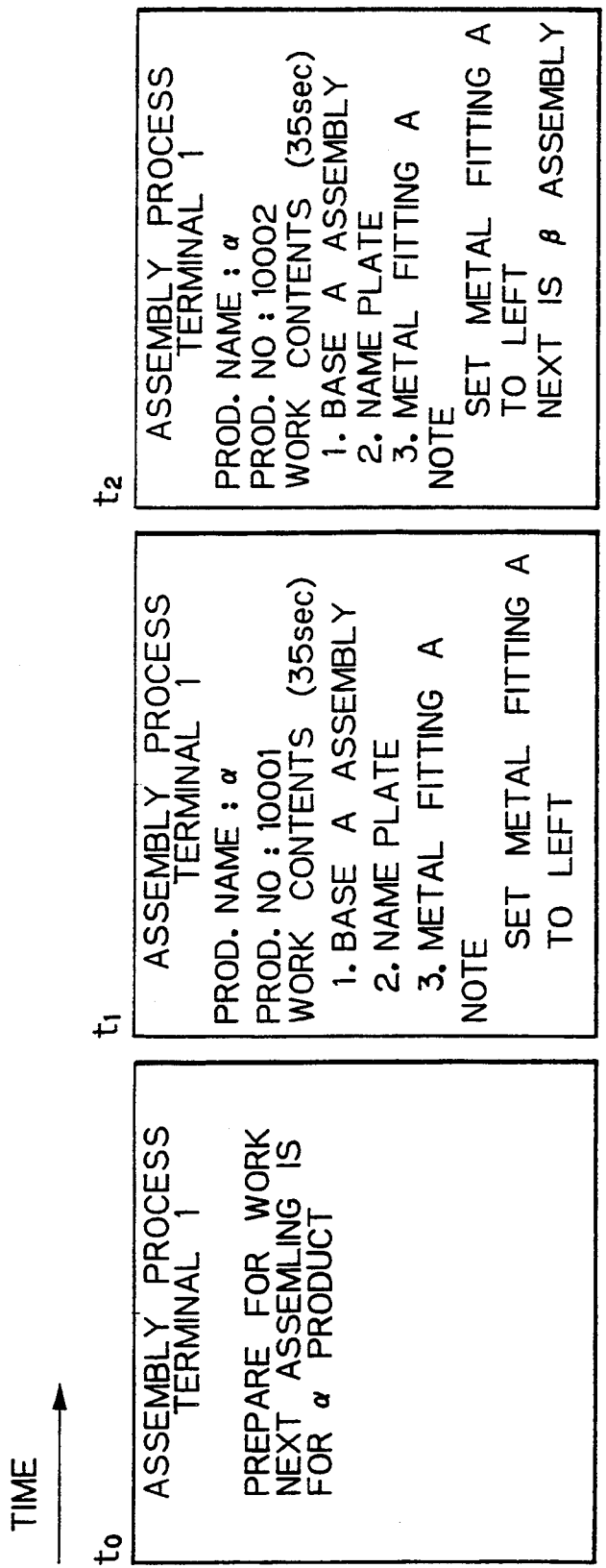

Fig. 17B t3

ASSEMBLY PROCESS
TERMINAL 1

PROD. NAME : β
PROD. NO : 851
WORK CONTENTS (18sec)
1. BASE B ASSEMBLY
2. P.S. BOLTS
NOTE t4

ASSEMBLY PROCESS
TERMINAL 1

PROD. NAME : β
PROD. NO : 852
WORK CONTENTS (18sec)
1. BASE B ASSEMBLY
2. P.S. BOLTS
NOTE
  THIS IS THE LAST
    WORK t5

ASSEMBLY PROCESS
TERMINAL 1

NO MORE WORK TODAY

Fig. 18A  [FAULT INFORMATION TERMINAL]                                         SEP 28, 92

TYPE    LT30 JIS G EH    PARTS NO. 000401
PRODUCT NO. 50372

TEST    00:  PRIMITIVE 01:  AGING     02:  FINAL     00
TEMP.   00:  NORM. T   01:  NORM. T   02:  HI TEMP.  00
VOLT    00:  NORM.     01:  -10%      02:  +10%      00
IMPULSE 00:  NO        01:  YES       02:  OTHERS    00

Fig. 18B  [FAULT INFORMATION TERMINAL]                                         SEP 28, 92

TYPE    PF7900B222C<P>  PATS NO 000002
PRODUCT NO.

TEST    00    TEMP    00    VOLT 00    INPULSE 00

OCCURRENCE    00:  NORM    01:  INTMIT    06:  REOCCURR 01
PHENOMENON CODE  423  REQUEST  11  NAME  JACK
PROG. NAME
FAULT CONTENT
    LINES ON SCREEN

Fig. 19A

[FAULT INFORMATION TERMINAL] TYPE: LT30/JIS G BH    PRODUCT NO.: 50372    SEP. 28, 92

(CONFIRM NO.)    000401

| No. | PROD NAME | LOT NO. | PARTS NO. | Y/N |
|---|---|---|---|---|
| 01 | LT SYS1H | 03P | 280050 | |
| 02 | LT BP1 | 01A | 1X0001 | |
| 03 | PWR116A | 04D | 12941 | |
| 04 | KB(JIS) | 11D | H714215T | |
| 05 | LCD | 14A | 17615 | |
| 06 | 3.5FPD | A6 | 20280417 | NG |
| 07 | 3.5DISK 135M | A8 | 0032050 | |
| 08 | | | | |
| 09 | | | | |
| 10 | | | | |
| 11 | .... | | | |
| 20 | | | | |
| 99 | OTHERS (SURFACE IS DAMAGED) | | | |

Fig. 19B

[FAULT INFORMATION TERMINAL] TYPE: LT30/JIS G BH  PRODUCT NO.: 50372  SEP. 28, 92

(CONFIRM NO.) 000401

| No. | PROD NAME | LOT NO. | PARTS NO. | Y/N |
|---|---|---|---|---|
| 01 | LT SYS1H | 03P | 280050 | |
| 02 | LT BP1 | 01A | 1X0001 | |
| 03 | PWR116A | 04D | 12941 | |
| 04 | KB(JIS) | 11D | H714215T | |
| 05 | LCD | 14A | 17615 | |
| 06 | 3.5FPD | A6 | 20280417 | |
| 07 | 3.5DISK 135M | A8 | 0032050 | |
| 08 | | | | |
| ... | | | | |
| 20 | | | | |
| 99 | OTHERS (SURFACE IS DAMAGED) | | | |

VERSATILE PRODUCTION SYSTEM AND METHOD OF OPERATING SAME

BACKGROUND OF THE INVENTION

1. Field of the Invention

The present invention relates to a versatile production system and methods for operating the system. The system manufactures various kinds of products, including small quantities, on a single production line. The present system particularly relates to methods for operating the system by monitoring the running conditions of the production line and automatically generating work order sheets so as to increase productivity by minimizing tact time of the production line.

2. Description of the Invention

In general, in a production line for manufacturing products, necessary parts for assembling the products are supplied; the products are assembled, tested and inspected and the performance of the assembled products are approved based on the results of the test and are conveyed to a packing site. It is preferable for mass production to install a production line for each product. However, a large factory space and a large number of production facilities are required when many different products are being manufactured. Also products are manufactured in small quantities having a separate production line for each product, idle time increases, and sections of occupied factory space, production facilities, and operators become redundant.

In order to solve these problems, an applicant of the present invention developed inventions previously filed at the Japanese Patent Office, entitled "Versatile Production System" and referenced as Japanese patent application numbers 4-290314 and 4-291665, having U.S. application Ser. Nos. 08/024,210 and 08/022,026, respectively. According to this system, a production system is provided that manufactures various kinds of products, including small quantities. In the system, work order sheets required for each process and information pertaining to defective parts found in the preceding processes on the production line are automatically provided. In addition, the system automatically produces a test result report before conveying the products to a packing site.

In such a production system, there are three aspects that should be considered to improve productivity. The first aspect is "tact time". In the production line, tact time, is consumption time for executing each process, such as product assembling, testing and inspection. Tact time is different depending on the work efficiency or health conditions of each operator. The tact time changes depending on each operator's working time because the work efficiency changes depending on each operator's working time.

The second aspect is that continual production proceeds without knowing the manufacturing condition of defective products. A product is defective if it includes missing parts or defective units. Defects are found in the assembled and tested products.

When continual production proceeds without knowledge of the defects (that is, if abnormal conditions occur), productivity deteriorates significantly. If the continual production proceeds without knowing the percentage of defective products, a significant number of defective products will potentially be manufactured.

The third aspect is described below. In the production line, consumption time for executing each process (such as assembling, testing and inspecting) is different so that tact time, which is the maximum consumption time for executing each process, is preferably minimized, whereby each operator does not have excess time between each process. In order to minimize tact time, work order sheets are occasionally prepared for each operator at each working site. Work order sheets are prepared by trial and error based on manual calculations when work is assigned to operators at each work site. Production then proceeds in accordance with the work order sheets.

However, the work order sheets obtained above are usually inappropriate, thereby providing operators with idle time and reducing productivity. In addition, preparation of the work order sheets requires time and labor, thereby preventing the work order sheets from being prepared on time when work order changes are required from the production control system.

SUMMARY OF THE INVENTION

The first object of the present invention, which solves the foregoing problems, is to provide a versatile production system and operating methods that have a monitoring function showing running conditions of the line, such as the work efficiency of each operator for each process and the current percentage of defective products, and that rapidly output appropriate work order sheets to each operator after determining a failure on the production line.

In consideration of the aforementioned problems, the second object of the present invention is to provide a versatile production system and methods that automatically generate work order sheets for each operator at each work site so as to minimize tact time, thereby increasing productivity, and that also automatically and rapidly generate work order sheets by assigning necessary work to each operator when work order changes are required from the production control system.

FIG. 1 is a basic construction drawing of a versatile production system of the present invention. The versatile production system of the present invention, which achieves the first object, comprising:

- at least one assembling site 1 for assembling parts delivered in order and making various kinds of products on a single production line;
- at lease one testing site 2 for testing and inspecting the performance or quality of assembled products;
- a plurality of line terminals 3 installed at any of the assembling sites or the testing sites;
- a communication-memory unit 4 attached to a product or a pallet for loading the product so as to match the flow of products and information and that communicates manufacturing data with the line terminals and memories when the pallet is conveyed to the production line;
- a line host controller 5 reads the memorized data from the communication-memory unit via the line terminals installed in the work places of the assembling sites and the testing sites, and uses the read data to output work order sheets for operators working at the assembling sites and the testing sites via the line terminals;
- a line host control terminal 6 that directly inputs and outputs data for master file maintenance, including work order control, progress control, schedule arrangement and machine history related data with the line host controller; and a fault product information terminal 7 that inputs fault code data showing the contents of faults for fault products that should be replaced, and deletes the fault code data after repairing the fault by replacing the fault parts.

The versatile production system includes the line host controller that monitors parameters such as time control, quality conditions and states of operators for running conditions of said versatile production line, compares the parameter data with a caution level threshold value and displays a caution notice when the parameter data is larger than the caution threshold value through the line terminals or the line host control terminal.

The versatile production system includes the line host controller that monitors parameters such as time control, quality conditions and states of operators for running conditions of said production line, compares the parameter data with a hazard level threshold value and displays a hazard notice when the parameter data is larger than the danger threshold value through the line terminal or the line host control terminal, and outputs work orders for rearranging the production line.

The versatile production system includes the line host controller that monitors parameters such as time control, quality conditions and states of operators for running conditions of the production line, compares the parameter data with a critical fault level threshold value and stops the production line, displays and outputs work orders for operators, thereby providing next work operations through the line terminals or the line host control terminal when the parameter data is larger than the critical threshold value.

In the versatile production system, the parameter related time control is calculated after communication with the line host controller via the line terminals concerning the memorized data in the communication-memory unit.

In the versatile production system, the parameter related quality conditions are calculated from data communicated with the line host controller via the line terminals or the fault product information terminal.

In the versatile production system, the parameters related to states of operators are calculated from sensor signals, which are installed in the workplaces for operators and electrically connected to a programmable controller and the sensor signals are transmitted to the line host controller via the line terminal.

A method for operating a versatile production system of the present invention comprises:
  a step 1 that monitors parameters such as time control, quality conditions and state of operators for running conditions of the production line;
  a step 2 that compares the parameter data with a caution level threshold value; and
  a step 3 that displays a caution notice when the parameter data is larger than the caution threshold value through the line terminals or the host control terminal.

A method for operating a versatile production system of the present invention comprises:
  a step 1 that monitors parameters such as time control, quality conditions and states of operators for running conditions of the production line, compares the parameter data with a hazard level threshold value;
  a step 2 that displays a hazard notice when the parameter data is larger than the danger threshold value through the line terminal or the line host control terminal; and
  a step 3 that outputs work orders for rearranging the production line.

In the method for operating a versatile production system, the production line is rearranged by means of changing the work man-hours for each operator and the number of operators, and the work place changes depending on the operators' rating.

A method for operating a versatile production system of the present invention comprises:
  a step 1 that monitors parameters such as time control, quality conditions and states of operators for running conditions of the production line;
  a step 2 that compares the parameter data with a critical fault level threshold value;
  a step 3 that stops the production line; and
  a step 4 that displays and outputs work orders for operators, thereby providing next work operations through the line terminals or the line host control terminal when the parameter data is larger than the critical threshold value.

A versatile production system which achieves the aforementioned second object of the present invention comprises:
  at least one of assembling sites 1 for assembling parts delivered in order and making various kinds of products on a single production line;
  at least one of testing sites 2 for testing and inspecting the performance or quality of assembled products;
  a plurality of line terminals 3 installed at any of the assembling sites or the testing sites;
  a communication-memory unit 4 attached to a product or a pallet for loading the product so as to match the flow of products and information and that communicates manufacturing data with the line terminal and memorizes same when the pallet is conveyed to the production line;
  a line host controller 5 reads the memorized data from the communication-memory unit via the line terminals installed in the workplace of the assembling sites and testing sites, and uses the read data to output work order sheets for operators working at the assembling sites and the testing site via the line terminals and outputs test result reports containing test/inspection record data for a product that has been assembled, tested and inspected and finally determined as defective free products via a line terminal installed at a final testing site; and
  a line host control terminal 6 that directly inputs and outputs data for master file maintenance, work order control, progress control, schedule arrangement and product history related data with the line host controller:
wherein the line host controller 6 is characterized in that it previously memorizes each file, such as work contents, operators, time changes standard parts feeding sequence, components of a product and maintenance tools; receives a production command from the production control system; calculates and shares work so as to minimize the tact; and outputs the work order sheets via the line terminal.

A versatile production system of the present invention further comprises a fault information terminal 7 that inputs fault content data for products having faulty parts to be replaced, inputs faulty parts data that indicates parts are defective, and deletes the faulty input data after repair by replacing the faulty parts.

In the versatile production system, the line host controller outputs work order sheets to minimize the tact via the line terminal;

the work order sheet is generated from a schedule file that records the work start date, type code, product name, product number, work sequence and work start time for a determined process, and a process base work file that indicates which product should be produced, and indicates when and what time the work should be started, and what work should be executed based on each process.

A method for operating a versatile production system of the present invention so as to minimize the tact comprises:

a first step to calculate an average value by dividing the total work man-hours that is the sum of man-hours required by each work for making a predetermined product by a process number corresponding to an operator number;

a second step to multiply each group sum of work man-hours for work assigned to each operator by each rating; namely, a work efficiency factor for each operator so as to render the work man-hours for each process equal or less than the average value.

A method for operating a versatile production system so as to minimize the tact comprises:

a first step to determine the intended assigned man-hours of each operator by dividing the sum of the total work man-hours by the sum of the rating of each operator and multiplying the operator rating;

a second step to assign works to each operator so as to render the work man-hours for each process equal or less than the intended assigned man-hours.

A method for operating a versatile production system so as to minimize the tact comprises:

a third step that assigns remaining work that was not assigned to each operator so as to obtain the total work man-hours for each operator by adding the group sum of work man-hours for each operator, which become substantially equal between operators.

BRIEF DESCRIPTION OF THE DRAWINGS

FIG. 6 is a table example showing a calculation process of a production line balance considered as most appropriate before modification;

FIG. 7 is a table example showing a calculating process of a production line balance considered as most appropriate after modification;

FIG. 8A is a half part of a table example for a work contents file stored in a memory area of a line host controller;

FIG. 8B is another half part of a table example for a work contents file stored in a memory area of a line host controller;

FIG. 9A is a table example for an operator file stored in a memory area of a line host controller;

FIG. 9B is a table example for a highly efficient working time zone file stored in a memory area of a line host controller;

FIG. 9C is a table example for a normal production sequence file stored in a memory area of a line host controller;

FIG. 10A is a table example for a maintenance tool file stored in a memory area of a line host controller;

FIG. 10B is a table example for a parts list file stored in a memory area of a line host controller;

FIG. 10C is a table example for a production command file stored in a memory area of a line host controller;

FIG. 11A is a table example of a process base file stored in a memory area of a line host controller;

FIG. 11B is a table example of a schedule file stored in a memory area of a line host controller;

FIG. 15 is a table example showing a first calculation process of a production line balance considered most appropriate;

FIG. 16 is a table example showing a second calculation process of a production line balance considered most appropriate;

FIG. 17A is a half part of a collection of display examples of work order sheets;

FIG. 17B is another half part of a collection of display examples of work order sheets;

FIG. 18A is a display example when fault unit data is input;

FIG. 18B is a display example when product error code are input;

FIG. 19A is a display example of a units list for a product before replacing faulty units;

FIG. 19B is a display example of a unit list for a product after replacing faulty units.

DESCRIPTION OF THE PREFERRED EMBODIMENTS

Figure 1:
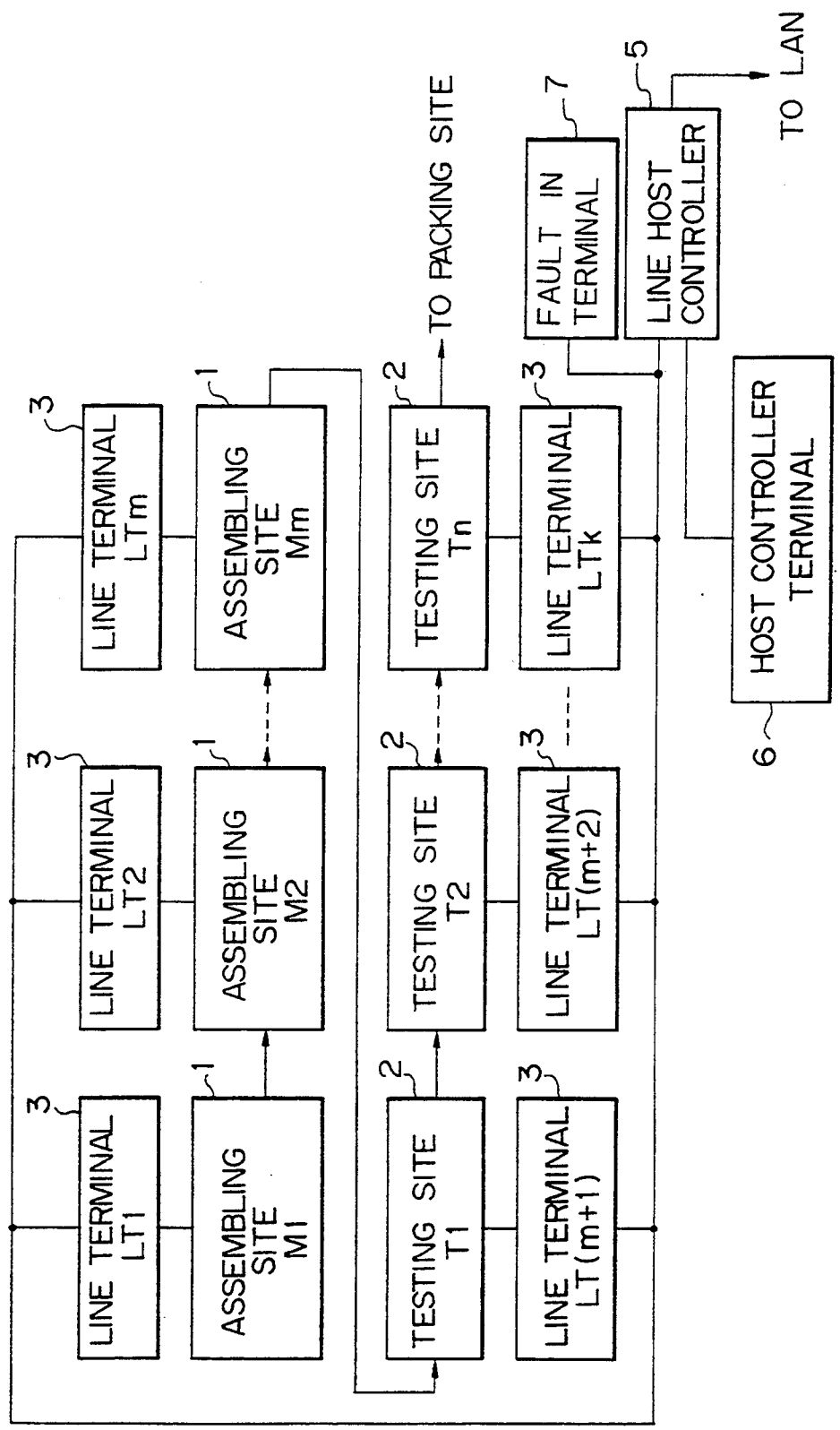
FIG. 1 is a basic construction drawing of a versatile production system of the present invention.
Figure 2:
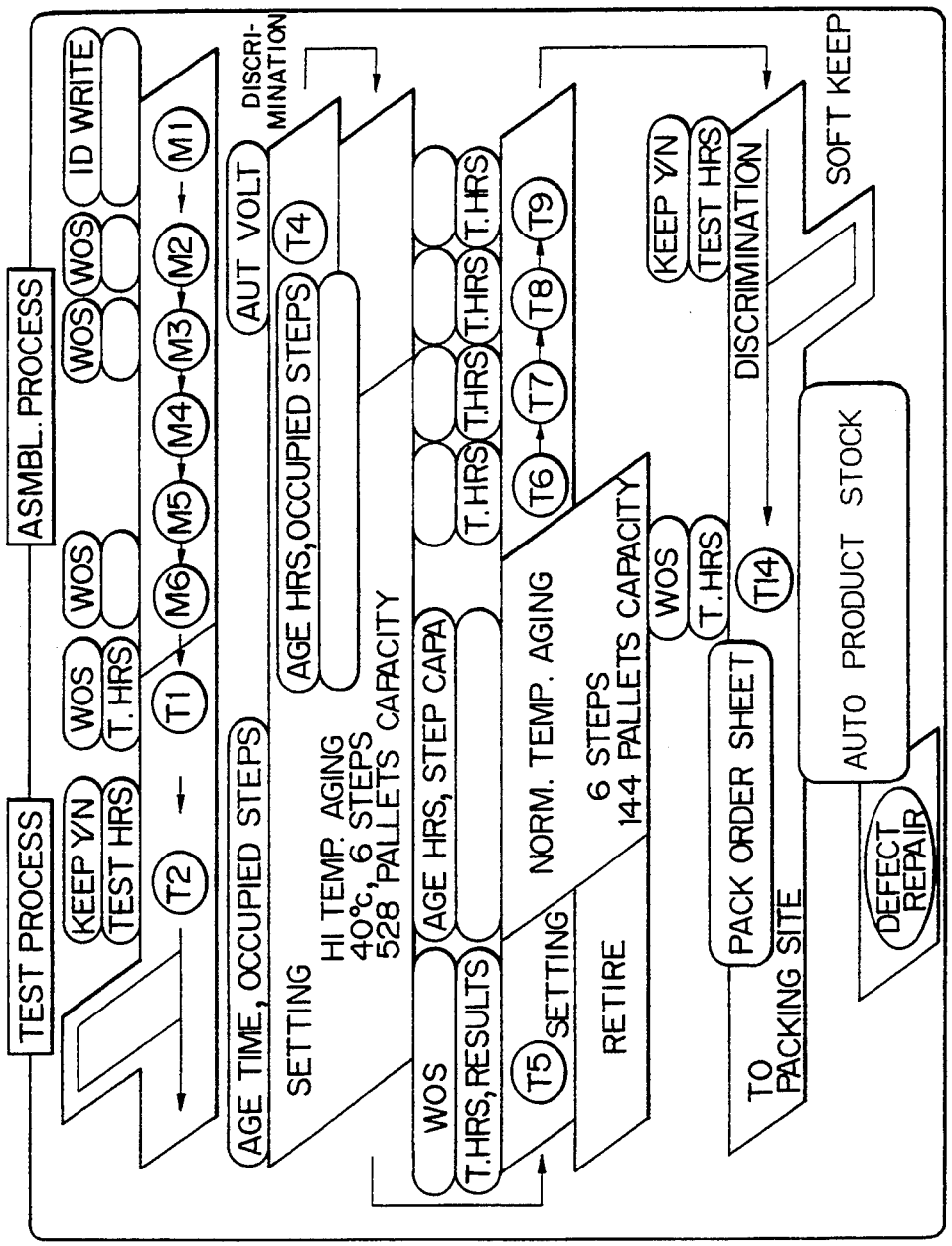
FIG. 2 shows an embodiment of a versatile production of the present invention.

FIG. 2 shows an embodiment of a versatile production system of the present invention. In FIG. 2, M1 to M6 denote assembly sites for assembling products. T1 to T14 denote testing sites for testing and inspecting semi-assembled products. A semi-assembled product implies an integrated body of parts making up a product, which is then transported during the assembling process, from assembly to completion of assembly, to the first testing site T1. In the assembling sites M1 to M6, semi-assembled products 1 to 6 are assembled. The assembling sites M1 to M6 include temporary parts supply stations (not shown), in which parts required for the type of product are stored. Trolleys are used to distribute parts, each of which distributes parts to the assembling sites M1 to M6 in the order in which the parts are assembled. Some assembling sites may not be used depending on the number of parts. For example, if assembling is completed by using assembling site M1 to M4, then assembling site M5 and M6 are not used. In this embodiment, an ID card (not shown) serving as a communication-memory unit or a data carrier is attached to a pallet which loads a product. The ID card is used to transfer information necessary for manufacturing products to or from a line host controller via line terminals.

Figure 3:
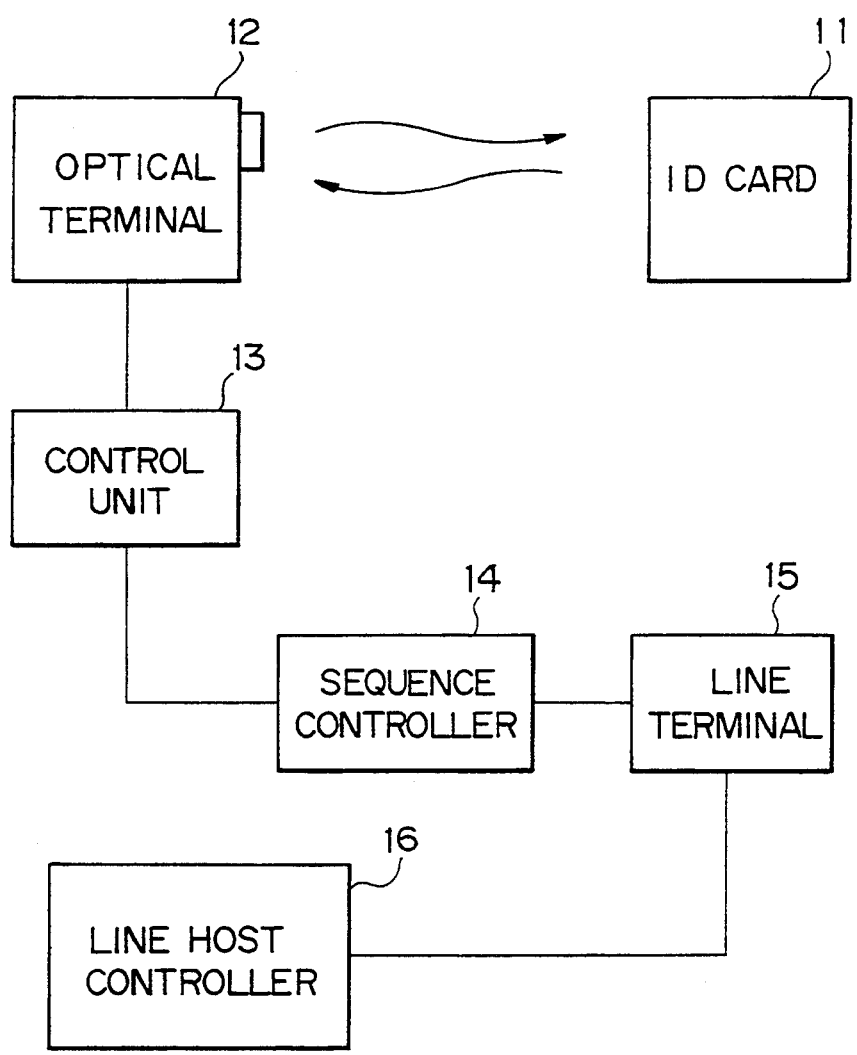
FIG. 3 shows hardware for linking between an ID card unit and a line host controller.

FIG. 3 shows hardware for linking between an ID card and a line host controller. In FIG. 3, a numeral 11 denotes what is referred to as an optical ID unit or an ID card in the present invention. The ID card 11 is attached to a product or a pallet which loads a product, and an optical terminal 12 is installed in each assembling site or each testing site. When the ID card arrives, a photoelectric switch installed in each assembling or testing site detects the presence of the ID card and a sequence controller 14 stops a conveyor belt, which is not shown. The assembling or testing is then started. Beforehand, the ID card 11 is communicated with via the optical terminal 12 to read or write data therefrom or thereon. Reading or writing data is effected by a line terminal 15 in each workplace under the control of a line host controller 16. A signal transferred via the optical terminal 12 is amplified by a control unit 13. The control unit 13 is connected through the sequence controller 14 or directly to the line terminal 15 using an RS-232C interface.

A line terminal in an assembling site M1 transmits a products code corresponding to a product type that has been entered by a keyboard or by reading a bar code to a line host controller. The line host controller writes data (such as a products code, a control number, a process number, a work start time, a work end time, and test patterns that are stored therein) on an ID card via a semi-assembled product handling terminal. The line host controller then informs an operator of the data for an ID card by outputting an assembling work order sheet to a CRT monitor or printer connected to the semi-assembled product handling terminal. The operator in the assembling site M1 starts driving a transporting means or a conveyor belt (not shown) so as to transport an assembled product according to the work order sheet.

At assembling sites M2 to M6, semi-assembled product terminals or line terminals installed therein read the product code, control number, and other data from the ID card attached to the pallet transported sequentially to the workplaces. The semi-assembled product terminals also read data pertaining to the type, part numbers, lot numbers, and the manufacturing dates of the parts making up the semi-assembled product, for example, from the bar codes attached to the parts. The semi-assembled product terminals then transmit the read data to the line host controller. The line host controller informs operators of the above data by outputting the assembly work order sheets associated with the assembling sites M2 to M6, to CRT monitors or printers connected to the respective semi-assembled product terminals. The work order sheets are also stored in the line host controller. The operators start a driving transporting means or conveyor belt (not shown) to feed semi-assembled products 1 to 6, which are being assembled, to the assembling sites at the subsequent steps. Finally, the semi-assembled product 6 is transported to a testing site T1.

A testing terminal or a line terminal in the testing site T1 reads the products code and the control number from the ID card attached to the transported pallet to identify the type, part numbers, lot numbers, and manufacturing dates of the parts making up the product by reading, for example, bar codes attached to the parts. The testing terminal then transmits this data to the line host controller. The line host controller determines whether any part is missing from the semi-assembled product 6, then issues a work order to a CRT monitor or a printer connected to the testing terminal, thus informing the operator. A typical work order issued in this manner may indicate, for example, Missing Part Found. Moreover, the testing terminal writes the data acquired in the testing site T1, on the ID card. This data includes a process number, a work start time, a work end time, and the results of determination indicating the presence or absence of a defect. The operator then starts driving a transporting means or a conveyor belt (not shown) to feed the semi-assembled product 6 to a testing site T2.

A line terminal in the testing site T2 reads the data of products code and the control number from the ID card attached to the transported pallet, then transmits this data to the line host controller. The line host controller checks and determines whether Software Keep should be executed; that is, if a test program should be written in the hard disk of the product, and then informs an operator of the results of the check by outputting the result to a CRT monitor or a printer connected to the line terminal. When it is determined that Software Keep should not be executed, the operator starts transporting the semi-assembled product to a testing site T3 at the next step, and when it is determined that Software Keep should be executed, the operator temporarily places the semi-assembled product on a Software Keep shelf, writes a test program on the hard disk of the product, and starts transporting the semi-assembled product to the testing site T3 at the next step.

A line terminal at the testing site T3 reads the data of products code and the control number from the ID card attached to the transported pallet, and then transmits the read data to the line host controller. The line host controller checks to determine if the semi-assembled product 6 should be retired (i.e. subjected, as a returned article, to a repairing process), then informs an operator of the result of the check by outputting same to a CRT monitor or a printer connected to the line terminal. When it is determined that the semi-assembled product should be retired, the operator places the semi-assembled product 6 at a retiring site. When it is determined that the semi-assembled product should not be retired, the operator checks a setting order indicating the conditions for setting high-temperature aging and low-temperature aging apparatuses, then sets the aging apparatuses according to the setting order. In the setting, the operator sets the aging time relative to a set aging voltage to, for example, two hours at a voltage L (a little lower than 5 V) or twelve hours at a voltage VH (a little higher than 5 V), and specifies the number of steps occupied by each aging apparatus that depends on the size, or especially, the height of a semi-assembled product. The operator then starts driving a transporting means inside the high-temperature aging apparatus toward a testing site T4 at the next step.

The number of occupied steps is set to six for each of the high-temperature aging and normal-temperature aging apparatuses. A transporting means covering six steps is installed, and depending on the height of a semi-assembled product, two or three steps are occupied for each semi-assembled product. The high-temperature aging apparatus consists of transporting means for outgoing and incoming paths. The normal-temperature aging apparatus includes a transporting means for an outgoing path alone. A retiring site is preserved not only in testing site T3 but also in testing sites T4, T5, T7, and T14.

A line terminal in the testing site T4, which is situated outside the outgoing path of the high-temperature aging apparatus, reads the data of the products code and the control number from the ID card attached to the transported pallet, and then transports the read data to the line host controller. The line host controller outputs the received data to a CRT monitor or a printer connected to the line terminal, thus reporting whether or not the semi-assembled product 6 has an automatic voltage change function. When the semi-assembled product 6 has the automatic voltage change function, the operator does not respond and when the semi-assembled product 6 does not have the function the operator modifies the set voltage value manually. The operator then starts driving a transporting means in the high-temperature aging apparatus to transport the semi-assembled product 6 through the outgoing path of the high-temperature aging apparatus toward a testing site 5 at the next step.

A line terminal in the testing site T5, which is situated outside the outgoing path of the high-temperature aging apparatus, reads the data of the products code and the control number from the ID card attached to the transported pallet, and then transmits the read data to the line host controller. The line host controller outputs the aging time for the normal-temperature (room-temperature) aging apparatus and the number of occupied steps for the semi-assembled product to a CRT monitor or a printer connected to the line terminal, thus informing an operator of the data. The operator sets the aging time for the normal-temperature aging apparatus and the number of occupied steps as informed, and then starts driving a transporting means in the normal-aging apparatus.

After normal-temperature aging is completed, the semi-assembled product is transported to a testing site T10. A line terminal in the testing site T10 reads the data of the products code and the control number from the ID card attached to the transported pallet, and then transports the read data to the line host controller. The line host controller outputs the received data to a CRT monitor or a printer connected to the line terminal, thus informing an operator whether Software Keep should be executed; that is, whether an operating system should be written. When Software Keep should be executed, the operator executes a write operation, and following that, the operator starts driving the transporting means to a packing site toward a testing site T14. When Software Keep should not be executed, the operator starts driving the transporting means without Software Keep.

A line terminal in the testing site T14 reads the data of the products code and the control number from the ID card attached to the transported pallet, and then transmits the read data to the line host controller. The line host controller issues a test result report to a printer connected to the line terminal at the testing site T14. Moreover, the line host controller executes Stocking After Testing; in other words, the line host controller reports the completion of assembly and inspection to a production management system. Furthermore, the line host controller communicates via a packing site host controller at a packing site over a LAN, and informs an operator of a packing work order by outputting the packing work order to a printer or a CRT monitor connected to the administration terminal of the packing site host controller. The work order indicates that a cardboard box required for packing should be prepared to transport a semi-assembled product to the packing site. On the other hand, the line terminal in the testing site T14 writes the data acquired in the testing site T14, which includes a process number, a work start time, a work end time, and the results of a determination representing the presence or absence of a defect, on the ID card. Finally, the operator starts driving a transporting means or a conveyor belt (not shown) so as to feed the product to the packing site.

Furthermore, in the vicinity of a workplace for repairing faulty products, a fault-in (information) terminal is provided. Through the fault-in terminal, data indicating faulty contents are input for the product in which at least one defective unit is found, defective parts data which are judged defective are input, and the faulty contents data or defective parts data are deleted when defective units or parts are replaced. In this way, quality control is executed.

A line host control terminal 6 is used when directly inputting or outputting the data relating to production management and quality control. This data includes master file maintenance, work order control, progress control, schedule arrangement, and product history control. The host controller 5 is called a floor controller because it is on the same floor as the production line. Furthermore, the line host controller 5 outputs work order sheets to minimize the tact via each line terminal.

Figure 4:
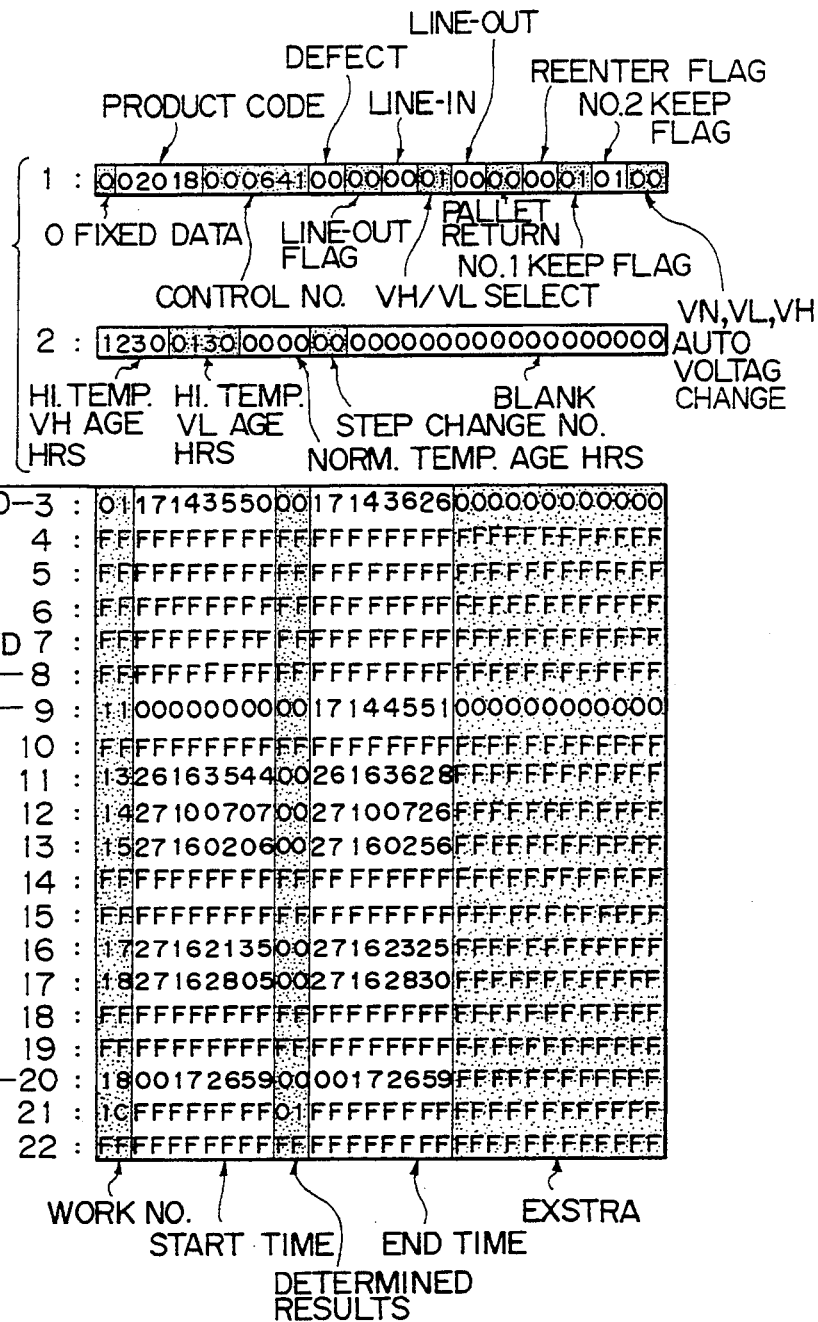
FIG. 4 shows a format of an ID card.

FIG. 4 shows a format of an ID card. An ID card employed in the embodiment has a storage capacity of 2K bytes as shown in FIG. 4. A 32-byte memory area (herein, one byte consists of four bits) is allocated to each of the 22 addresses. In this memory map, data stored at address 1 are fixed data, a products code, a control number, data indicating the presence or absence of a defect, a line-out flag, a line-in flag, selection of VH or VL, line-out Process, Pallet Return, a re-entry flag, a No. 1 Keep flag, a No. 2 Keep flag, and Automatic Voltage Change of VN, VL, and VH. Data stored at address 2 are a high-temperature VH aging time, a high-temperature VL aging time, a normal-temperature aging time, Step Change, and supplementary data related to line control. Data stored at addresses 3 to 8 are the process numbers, start times, the results of determination, end times, and supplementary data of semi-assembled products 1 (assembling site M1) to semi-assembled products 6 (assembling site M6). Data stored at addresses 9 to 10 are process numbers, start times, the results of determination, end times, and supplementary data of semi-assembled products from the beginning of the test process (at a testing site T1) to the end of the test process (at a testing site T14).

The contents of the memory will be described as a supplement. Fixed data represents a leading address of a memory area and is set to 0. The products code and the control number indicate a product type and a parts number, respectively. The presence or absence of a defect indicates whether or not a part is missing or an abnormality is found in the results of a test. The line-out flag provides identification data indicating that a product should be neither assembled nor tested until a product, in which a defect is detected, reaches the first retiring space. The line-in flag specifies re-entry; that is, provides data indicating whether or not product is retired, or in which process a retiring order is issued. For example, 00 represents No Retired Product. 01 represents Retire Order issued in Process 1. Selection of VH or VL indicates whether VH or VL is set to an automatic power change unit installed at a testing site T4. Line-out Process indicates a process in which a product is retired. Pallet Return is data indicating whether a pallet should be returned to a leading process by passing through or bypassing the high-temperature aging apparatus. The re-entry flag specifies whether or not the product is a re-entered article. The No. 1 Keep flag specified whether or not to load a test program. The No. 2 Keep flag specifies whether or not to load an operating system on a hard disk. Automatic voltage Change of VN, VL, and VH indicates whether a product has an automatic voltage change function.

The high-temperature VH aging time, high-temperature VL aging time, and normal-temperature aging time, which reside at address 2, are provided, for example, as data 1230, meaning that aging continues for twelve and a half hours. Step Change indicates the selection of one step, two steps, or three steps. The process numbers residing at addresses 3 to 22 are concerned with assembling sites M1 to M6 or testing sites T1 to T14. The start time or end time is written in the form of a date, hours, minutes, and seconds. The results of the determination indicate the presence or absence of a defect.

As described above, an ID card stores data of each product. As a semi-assembled product is transported over a production line, the ID card is read and written at assembling and testing sites. Based on these data, up-to-date and accurate work orders are issued. Communication with a quality information system and a production management system enables the common use of data and offers support to quality control and production management systems.

Figure 5:
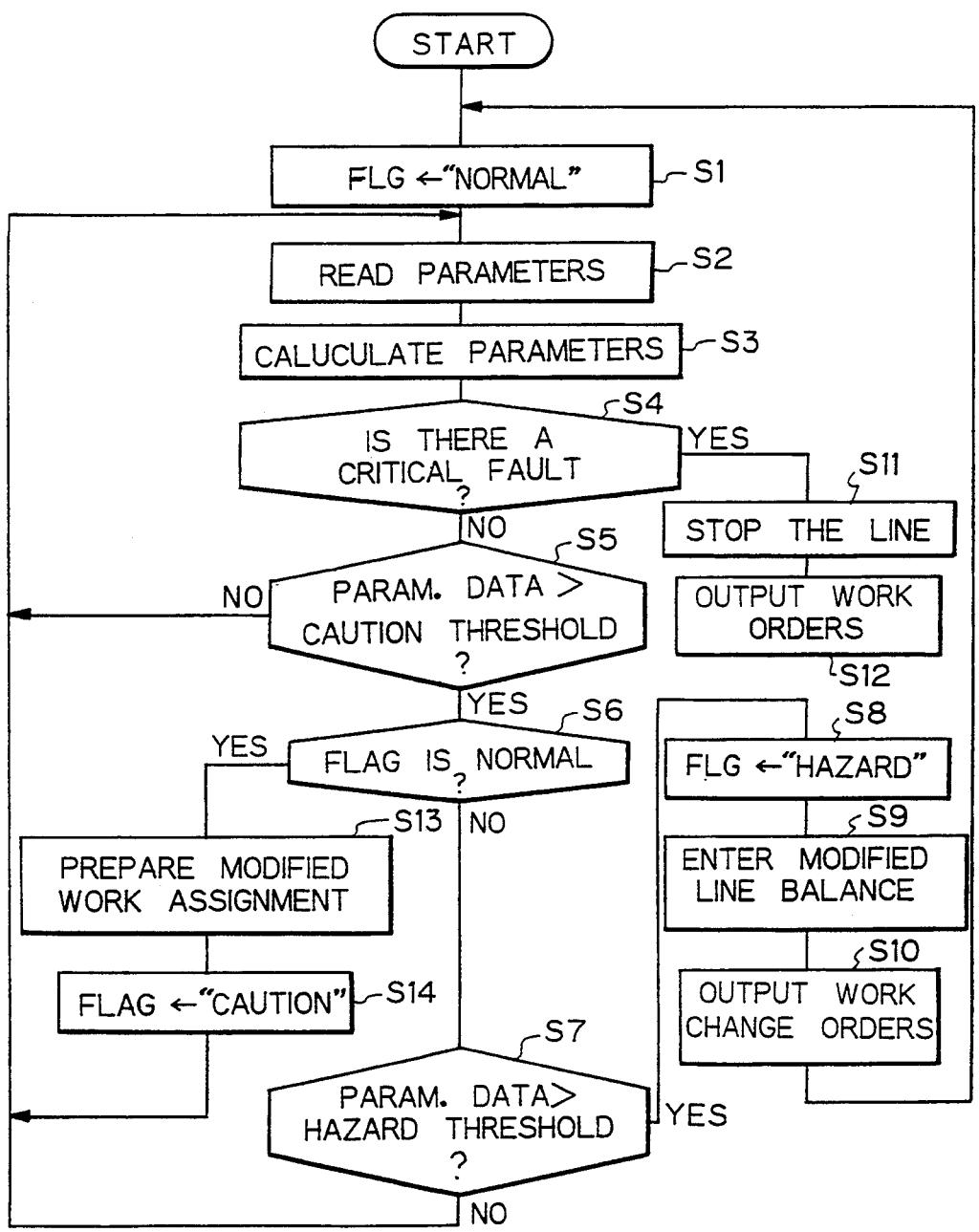
FIG. 5 is a flow chart for a monitoring process of a versatile production system of the present invention.

FIG. 5 is a flow chart for a monitoring process of a versatile production system of the present invention. Before explaining FIG. 5, parameters used for monitoring the versatile production system of the present invention will be explained. The parameters are divided into three main factors such as (A) time controls, (B) quality conditions and (C) state of operators.

According to (A), time control based parameters, there are three main parameters: tact time, line balance and man-hours for each process that is input from line terminals. All of these parameters are calculated based on input data through the ID cards, in such a manner that the tact time is calculated from the time each semi-assembled product is passing the individual working site, the line balance is calculated from the time differences between the maximum tact time and the minimum tact time in each process, and the number of man-hours for each process is calculated by deducting the work start time from the work end time. There is another parameter according to (A), that is, operator unoccupied time, which is calculated from sensor input signals located at each working site so as to detect the existence of the operator.

According to (B), quality condition based parameters, there are several parameters pertaining to the frequency of faulty products occurring based on types, processes, contents, parts and critical faults, which are calculated from input information mainly obtained through the faulty information terminal each time faulty products are found.

According to (C), the state of operator based parameters, there are three main parameters: stop hours at the same location, remaining hours outside the normal working site, and frequency of moving from the working site, all of which report the status of the operator. These parameters are calculated from sensor input signals provided at each working site and electrically connected with programmable controllers, and are then communicated with the line host controller via each of the line terminals.

The threshold value table are explained hereinafter. In the embodiments of the present invention, a caution level and a hazard level are provided as threshold levels, and additional threshold levels may be provided if necessary.

The calculations of each parameter are enplaned below. Each parameter is defined as follows:

(A) Time controls $T_{start}$: work start time of a process $T_{s0}$: arriving time of a semi-assembled product (for nth product)

$t_{s1}$: arriving time of a semi-assembled product (for (n+1)th product)

$T_{end}$: work end time of a process $T_{out}$: product feeding time from a process $T_{tact}$: tact time of a process ($T_{tact} = T_{s1} - t_{s0}$)

$T_{stop}$: work stop time ($T_{stop} = T_{out} - T_{end}$)

$T_{kosu}$: working man-hour ($T_{kosu} = T_{start} - T_{end}$)

$T_{bar}$: line balance [$T_{bar} = MAX(T_{tact}) - MIN(T_{tact})$], where $T_{start}$, $T_{s0}$, $T_{s1}$, $T_{end}$ and $T_{out}$ are direct input data received through the ID cards, and $T_{tact}$, $T_{stop}$, $T_{kosu}$ and $T_{bar}$ are calculated from the input data received through the ID cards.

(B) Quality conditions $N_{in-l}$: number of semi-assembled products fed in to the production line (counted at the first working site)

$N_{in-k}$: number of semi-assembled products passed through each working site $N_{err-d}$: same product type faulty product number occurrence $N_{err-k}$: same process faulty product number occurrence $N_{err-n}$: same contents faulty product number occurrence $N_{err-b}$: same parts faulty product number occurrence $Q_{kisyu}$: same type faulty product occurrence frequency ($Q_{kishu} = (N_{err-d}/N_{in-l}) \times 100$)

$Q_{kotei}$: same process faulty product occurrence frequency ($Q_{kotei} = (N_{err-k}/N_{in-k}) \times 100$)

$Q_{naiyo}$: same contents faulty product occurrence frequency ($Q_{naiyo} = (N_{err-n}/N_{in-l}) \times 100$)

$Q_{buhin}$: same parts faulty product occurrence frequency ($Q_{buhin} = (N_{err-b}/N_{in-l}) \times 100$, where $N_{in-l}$, $N_{in-k}$, $N_{err-d}$, $N_{err-n}$ and $N_{err-b}$ are direct input data received through the fault information terminal, the line terminals or the ID cards, and $Q_{kishu}$, $Q_{kotei}$, $Q_{naiyo}$ and $Q_{buhin}$ are calculated from the direct input data above.

(C) State of operators $T_{m-stp}$: stop time in the same spot $t_{m-out}$: traveling time outside of the normal working site (time)

$C_{m-out}$: number of moving outside from the normal working site (number), where $T_{m-stp}$, $T_{m-out}$ and $C_{m-out}$ are calculated from sensor input signals for detecting each operator at each working site.

The methods for reading input data for the parameters are explained below.

(A) As time data information of each process, each work start time of a process is input from the ID card and work end time is input from the keyboard by each operator. The start time and the end time of each process can be automatically recorded from the ID card attached to each product when it passes through the working site. The work end time can be input from the keyboard by an operator when the operator completes the process or as the last signal generated from a robot or an automated unit when the process is completed by the robot or the automated unit.

(B) As faulty product information, data such as types, occurring time, processes, contents, parts and otherwise regarding faulty product occurrence frequencies are recorded through the fault information terminal, the line terminals or ID card.

When a faulty product is found, the contents of the fault are transmitted to the line host controller. The contents include the test result information written on the ID card or a hard disk in each product.

(C) As operator location information, data such as accumulated time the operator spent at the working site at which the operator spent the main working hours of the day, accumulated time the operator spent outside the normal working site, and the frequency that the operator moved outside the normal working site are calculated from sensor signals, which detect the operators working at each working site. The sensors are connected to each programmable controller located at each working site. The data are stored in a memory area in the line host controller. The sensors may be touch sensors attached to a mat placed at a working site, thereby monitoring the location of the operator.

FIG. 5 is explained below. In FIG. 5, the numeral following the letter "S" indicates the step number.

(STEP S1): Initialize all flags to zero (normal state) in the memory area of the line host controller.
(STEP S2): Read all parameter data described above.
(STEP S3): Calculate all parameters described above.
(STEP S4): Register necessary information into a file related to a critical fault that should be input by a keyboard, which belongs to the fault information terminal, thereby verifying the occurring fault event with the registered information. If the event is determined as a critical fault, go to STEP S11, if not go to STEP S5.
(STEP S5): Compare each parameter data with each threshold value of the corresponding caution level, if the value of the parameter data is less or equal to the threshold value, return to STEP S2, if not, go to STEP S6.
(STEP S6): Check whether any of the flags are zero (indicates normal condition) or not, if yes, go to STEP S13, if no, go to STEP S7.
(STEP S7): Compare each parameter data with each threshold value of the corresponding hazard level, if the value of the parameter data is less or equal to the threshold value, return to STEP S2, if not, go to STEP S8.
(STEP S8): Set the flag for hazard to 1.
(STEP S9): Input data into a memory area of the production line based on a modified table that is obtained by calculating the production line balance considered most appropriate.
(STEP S10): Output work change order information ordering work to be changed determined from the modified table via each line terminal.
(STEP S11): Stop the production line, i.e., stop new supply to the line, and stop all delivery conveyors except the aging device.
(STEP S12): Output the work order for the next production. For example,
  (a) Retire, i.e., return returned goods to a repair process, where the returned goods mean semi-assembled products that cannot continue to the following production process in the middle of the production line because of faults.
  (b) Input the keyboard and note the completion of the process
  (c) Command the restart procedure
(STEP S13): Change the data in the operator table indicating identification number, name and rating of operators. In the change, each working time for each process M1, M2 and M3 is calculated based on the ID card information or the key board operations by each operator input at every work end time and the rating for each operator is determined as follows.

*Planned work man-hour=standard work time×100/rating data stored in the operator table*

*Real work man-hour=standard work time×100/current operator rating data* where the current operator rating data is calculated from each process work time obtained from the input data input via ID card or each line terminal keyboard. The current rating is calculated by solving the two formulae above.

*Current operator rating data=(Planned work man-hour/Real work man-hour)×Rating data stored in the operator table*

Furthermore, in STEP S13, preparation for work assignment with the modification table proceeds. Namely, the process for generating a schedule file includes information pertaining to the completion of work preparation, the work start date, the code of a product type, the name of equipment, the number of products, the sequence of work and the work start time of each process, and an individual process work file includes the product name for manufacturing, the production number, the work start time and the work contents.

(STEP S14): Set caution flag to 1.

FIG. 6 is a table example showing a calculation process of a production line balance considered most appropriate before modification, and FIG. 7 is a table of the same after modification.

In FIG. 6 and FIG. 7, $X_1$ to $X_{21}$ indicate the man hours of each operator, $A_1$ to $A_3$ indicate the sum of man-hours of each process, $R_1$ to $R_3$ indicate the rating of each operator, m indicates the number of processes and n indicates the number of individual work. In these drawings, m=3 and n=21.

In the example shown in FIG. 7, the calculating method is shown to realize the most appropriate production line balance when the operator rating for the process $M_2$ changes from 80 to 70.

Hereinafter, the mode of operations is explained. Before the explanation, various kinds of files stored in a disc in the line host controller are explained. These files include work contents, operators, time change and standard parts feeding sequence previously generated and can be maintained by the host controller terminal, files for stock parts control and maintenance tools loaded to a disc in the line host controller, a file for a work order such as manufacturing number input from the production control system, a schedule file to improve the productivity of the production line generated from the production system, and the individual process file.

FIG. 8A and FIG. 8B show a table example for a work contents file stored in a memory area of a line host controller. Type code 10451 and 74329 correspond to product name $\alpha$ and $\beta$, respectively. In each product, various kinds of work is assigned, for example, work name $X_1$ to $X_{21}$ are assigned to the product name $\alpha$, while work names $X_{22}$ and thereafter are assigned to the product name $\beta$. As for each work name, data such as work contents, assembling parts, preparation and cleaning hours, working man-hours, working sequence and cautions (not shown in the table) are stored in a disk in the line host controller. And as for assembling parts, the data such as parts name, parts supplied and quantity of parts are stored. As for preparation and cleaning hours, hours for preparation and cleaning data are stored, respectively.

In the work sequence column, numerical data 1 to 18 are stored for the product name $\alpha$. The numerical data are ordered in accordance with how effectively the product name $\alpha$ can be assembled by processing individual work names $X_1$ to $X_{21}$ in order. If there are more than two similar numerical numbers to each work name, work contents of the work name can be started for whichever work content is first. Furthermore, the time of preparation and cleaning hours and the work man-hours may be measured in minutes or seconds.

As a caution column, for example, for work name $X_5$, "Metal fitting should be mounted to the far left side", and as for work name $X_{15}$, "No gap with upper cover", important message data for assembling work are explained. The work contents file explained above is constructed by this data base or otherwise.

FIG. 9A, FIG. 9B and FIG. 9C are table examples for an operator file, a highly efficiency working time zone file and a normal production sequence file respectively stored in a memory area of a line host controller.

FIG. 9A indicates an operator file. In this file, identification number data, name data and rating data of each operator are stored.

FIG. 9B indicates a time zone during which an operator can work effectively.

FIG. 9C indicates the type code in the left column, and the production sequence number in the right column. If the same production sequence number exists in a different type code, any type code product can be produced first.

FIG. 10A is a table example for a maintenance tool file stored in a memory area of a line host controller. This table in particular shows data for current maintenance tool stock quantities for a test process. The data decreases when the tools are brought to the production line and increases when the tools are returned from the line.

FIG. 10B is a table example of a parts list file stored in a memory area of a line host controller. This table shows a parts list including maintenance tools for a product name $\alpha$. From this file, the name and number of maintenance tools used for each product can be determined.

FIG. 10C is a table example of a production command file stored in a memory area of a line host controller. As shown, production command data such as the work start up date, the type and code, the name of products, the manufacturing quantities and the scheduled completion date are stored in the file.

FIG. 11A is a table example of a process base file stored in a memory area of a line host controller. For each process such as M1, M2 and M3, data pertaining to the products name, the quantities of manufacturing, the work start up date and time, the tact pitch (measured in seconds or minutes) and the work contents are stored in the file. As the work contents data, work name data $X_1$ to $X_{21}$ are stored.

FIG. 11B is a table example of a schedule file stored in a memory area of a line host controller. In this file, data of the work start up date, the type and code, the production number, the production sequence number and the work start up time for the first process M1 are stored. As mentioned above, each file such as the work content, the operator, the time zone and the production sequence number are previously made, the parts list file and the maintenance tool file are then loaded, and after the production command data from the production control system are input, each following step and a process base work file and a schedule file can be obtained.

Figure 12:
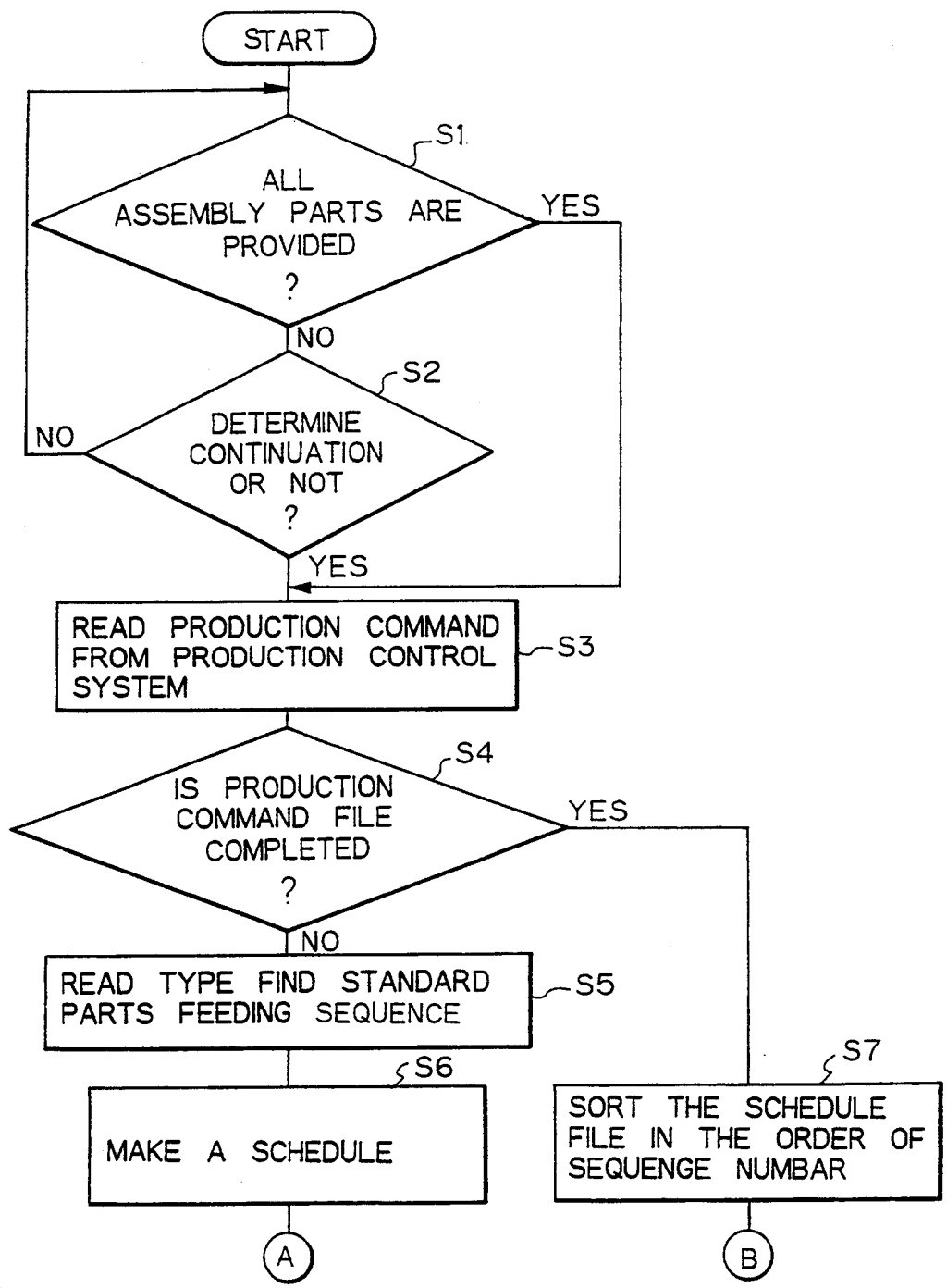
FIG. 12 is a first part of a process flow chart for generating a work order sheet arranging an appropriate production line balance.

FIG. 12 is a first part of a process flow chart for generating a work order sheet arranging a production line balance that is most appropriate. In the drawings, the numeral following the letter "S" indicates the step number. Each file (such as the work contents, the operators, the time zone and the standard parts feeding sequence) and each parts list file and maintenance tool file are previously loaded. The production command signal for manufacturing the number of products is received from the production control system. The contents of these files are described in the following.

(STEP S1): Determine whether or not all assembling parts are provided. If yes, go to STEP S3, if no, go to STEP S2. This is determined by comparing each part quantity data to compose a product that is written in a parts list file for the product that is produced in the next process with the stock quantity data of each part stored in the disc of the line host controller as parts control. Namely, the stock quantity is checked to determine whether or not there is the necessary quantity for making a product in the next process. Stock quantities are always checked whenever parts are supplied to or removed from the stock.

(STEP S2): Determine whether or not to continue the process when there is insufficient stock. If it is determined to continue, go to STEP S3, if not, return to STEP S1. The process can be continued if the operator determines that the missing parts can be provided later.

(STEP S3): Read the production command from the production control system.

(STEP S4): Determine whether or not the production command file is completed. If yes, go to STEP S7, if no, go to STEP S5.

(STEP S5): Read the type code and find the standard parts feeding sequence.

(STEP S6): Make a schedule file in which the work start date, the type code, the name of a product, the quantity of the manufacturing product, the work sequence and the work start time of a determined work process are provided.

(STEP S7): Sort the schedule file in the order of the feeding sequence number. STEP S3 to S6 described above are stages for determining the feeding sequential number for the production system command.

Figure 13:
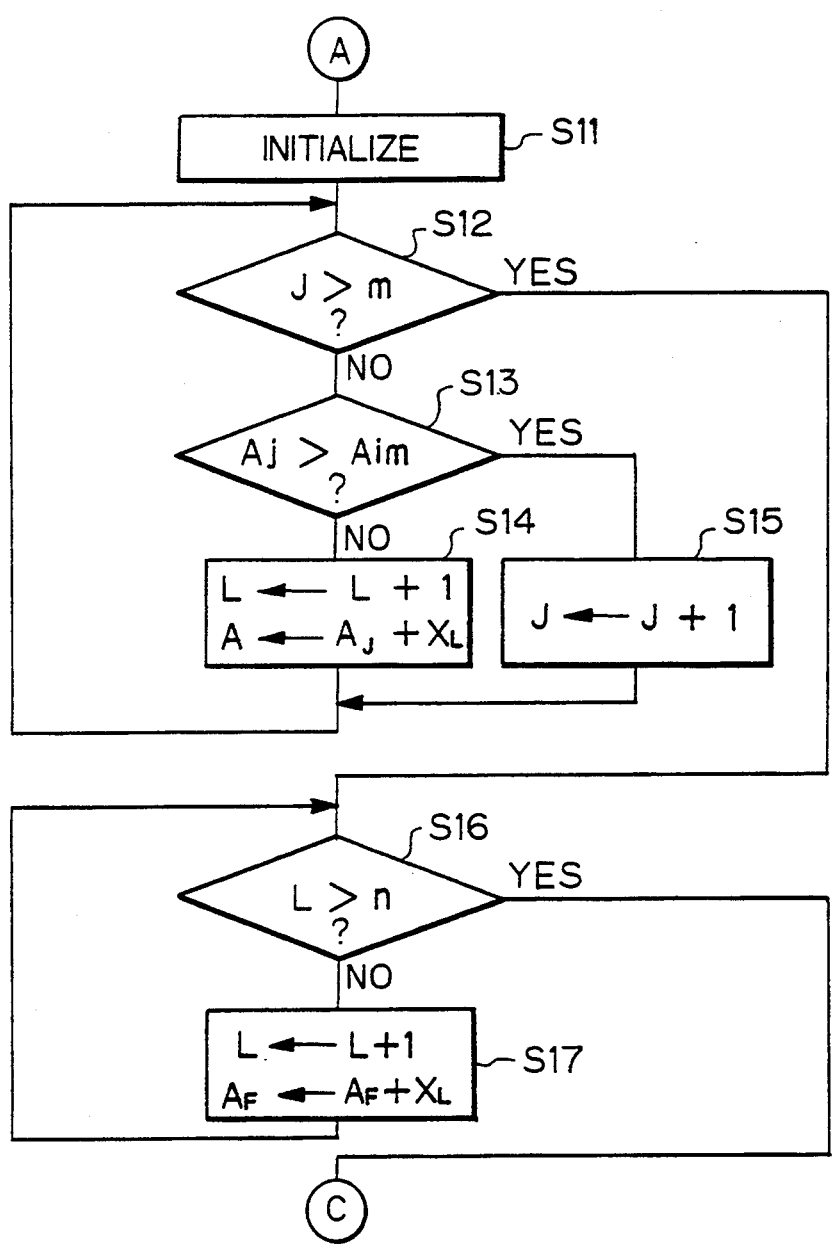
FIG. 13 is a second part of the flow chart continuing to FIG. 12.

FIG. 13 is a second part of the flow chart continuing to FIG. 12.

(STEP S11): Assume total work number is n quantities, total work man-hour is X minutes, each work man-hour is $X_n$ minutes and the process number is m quantities. As a No. 1 method, assume (total work man-hour/process number=X/m)=$A_{i1}$=$A_{i2}$=... $A_{im}$ minutes, while as a No. 2 method, assume $A_{i1}$=(total work man-hour)$\times R_1/(R_1+R_2+...+R_m)$ $A_{i2}$=(total work man-hour)$\times R_2/(R_1+R_2+...+R_m)$... $A_{im}$=(total work man-hour)$\times R_m/(R_1+R_2+...+R_m)$ Set the work man-hours for each process as $A_m$ minutes, the imaginary process man-hours as $A_F$ minutes, the Rating as R and changeable values as L and J. The original settings of X, $A_{im}$, $A_m$, $A_F$ and L are 0, while the original setting of J=1.

(STEP S12): Compare j with m. If J is larger than m, go to STEP S16. If J equals m or J is less than m, go to STEP S13.

(STEP S13): Compare $A_J$ with $A_{im}$. If $A_J$ is larger than $A_{im}$, go to STEP S15. If $A_J$ equals $A_{im}$ or $A_j$ is less than $A_{im}$, go to STEP S14.

(STEP S14): Add L plus 1 and update the data. Add $A_J$ plus $X_L$ and update the $A_J$ data.

(STEP S15): Add J+1 and update the J data in the memory.

(STEP S16): Compare the variable data L with the total work number n. If L is larger than n, go to STEP S21, if L equals n or if L is less than n, go to STEP S17.

(STEP S17): Add L plus 1 and update the data L. Add $A_F$ to $X_l$, and update the $A_F$ data in the memory.

Figure 14:
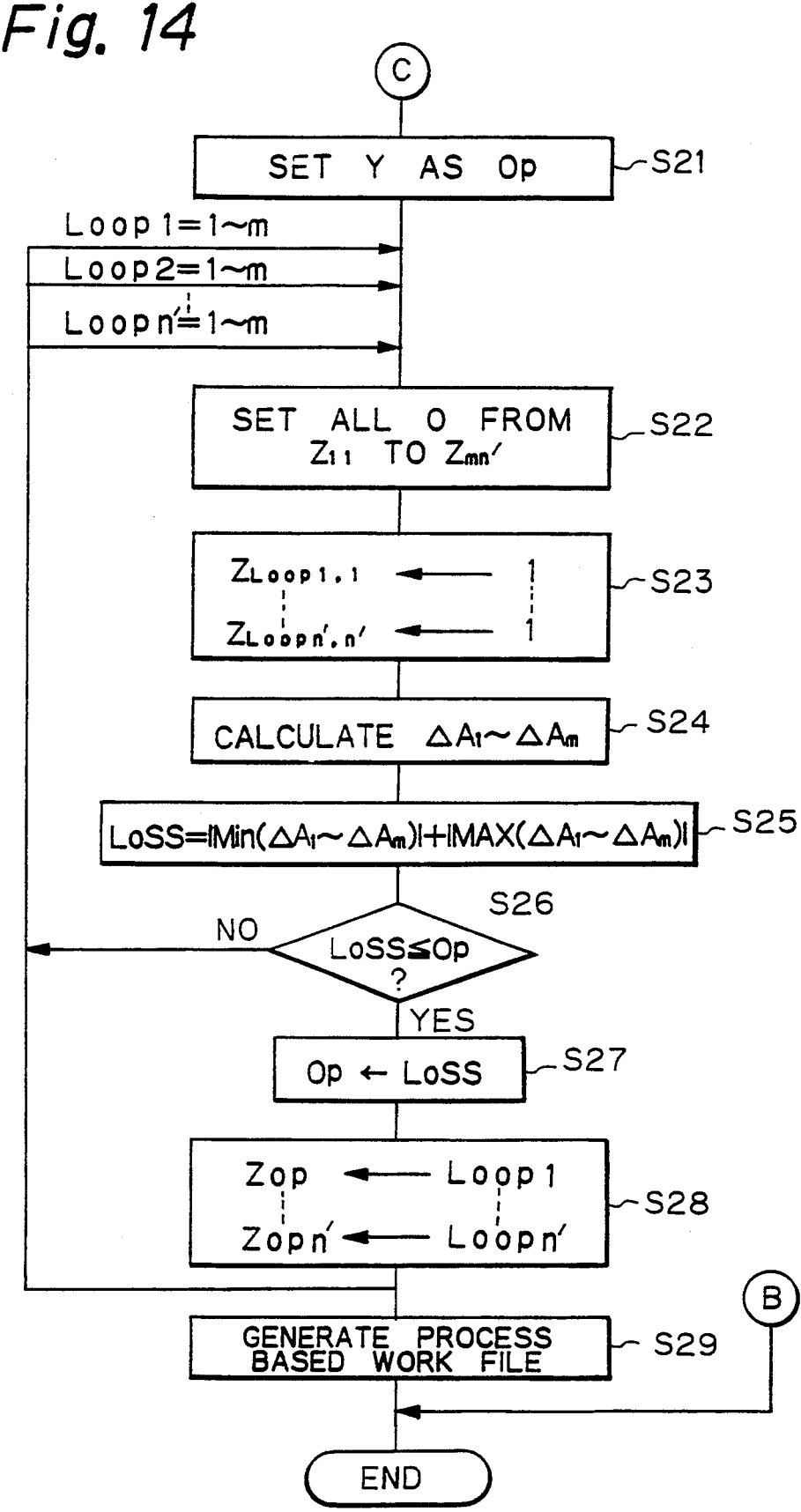
FIG. 14 is a last part of the flow chart continuing to FIG. 13.

FIG. 14 is the last part of the flow chart continuing to FIG. 13. Divide $A_F$, an element of imaginary process man-hours into $X_l$, $X_{l+1}$, ... $X_n$. For minimizing production line tact, the line balance loss, that is, redundant time from the time difference between the working time of each process will be minimized in the following method.

Calculate the element number n' of imaginary process man-hours $A_F$ from $n-l+1$. And calculate the total working man-hours Y after multiplying the rating using the following formula (1).

$$Y = A_1 \times 100/R_1 + A_2 \times 100/R_2 + ... + A_m \times 100/R_m + X_l + X_{l+1} + ... + X_m \quad (1)$$

$$\text{average value } y = Y/m \quad (2)$$

Calculate the formula (2) and calculate the difference between the average and the man-hours of each process from the formula (3).

$$\Delta A_1 = y - (A_1 \times 100/R_1 + X_l \times Z_{11} + \quad (3)$$
$$X_{l+1} \times Z_{12} + ... + X_n \times Z_{1n'})$$

$$\Delta A_2 = y - (A_2 \times 100/R_2 + X_l \times Z_{21} +$$
$$X_{l+1} \times Z_{22} + ... + X_n \times Z_{2n'})$$

-continued $$\Delta A_m = y - (A_m \times 100/R_m + X_l \times Z_{m1} +$$
$$X_{l+1} \times Z_{m2} + ... + X_n \times Z_{mn'})$$

Then execute the following steps.

(STEP S21): Set the average value y previously calculated as the variable number $O_p$ to determine the line balance.

(STEP S22): Set all 0 from matrix $Z_{11}$ to $Z_{mm'}$, where $Z_{11}$ to $z_{mn'}$ are variable data of 1 or 0.

(STEP S23): In Loop 1 from 1 to m in the variable number $Z_{LOOP\ 1,1'}$ in Loop 2 from 1 to m in the variable number $Z_{LOOP\ 2,2'}$ ..., and in Loop n' from 1 to m in the variable number $Z_{LOOP\ n',n'}$, execute STEP S24, STEP S25 and STEP S26 and return to STEP S22.

(STEP S24): Calculate from $\Delta A_1$ to $\Delta A_m$.

(STEP S25): Add the minimum value of the absolute value of $\Delta A_1$ to $\Delta A_m$ with the maximum value of the absolute value of $\Delta A_1$ to $\Delta A_m$, and set the sum as a loss data.

(STEP S26): Compare the Loss value with $O_p$ value, if the Loss value equals the $O_p$ value or is less than the $O_p$ value, go to step S27. If the Loss value is larger than the $O_p$ value, go back to STEP S22.

(STEP S27): Set the Loss value as a variable number $O_p$.

(STEP S28): Memorize variable number $Z_{op1}$ from the $LOOP_1$ from 1 to m. Memorize variable number $Z_{op2}$ from the $LOOP_2$ from 1 to m. Memorize variable number $Z_{opn'}$ from the $LOOP_{n'}$ from 1 to m.

From this, it is determined which of $Z_{11}$ to $Z_{mn'}$ is set to 1 for each process. In other words, it is determined which work is processed in which process, namely, each matrix data 1 or 0 for $Z_{11}$ to $Z_{mn'}$ is determined.

(STEP S29): Generate the process based work file that indicates when and what time the work process starts, what product is going to be manufactured and which work should be executed.

FIG. 15 is a table example showing a first calculation process of a production line balance considered most appropriate. This example shows how to calculate and minimize the line balance loss under the total number of operations is 21 (n=21), the number of processes such as M1, M2 and M3 is 3 (m=3), and each operator rating is $R_1=110$, $R_2=80$, and $R_3=95$, respectively.

Each work man-hours $X_1$, $X_2$, ... $X_{21}$ is as shown in FIG. 15, the sum of $X_1$ to $X_6$ is $A_1$ equals 62, if $X_7$ added to $A_1$, the sum becomes 80, which is larger than $A_{im}=213/3=71$ (total work man-hour/process number). So that processes after $X_7$ are determined as the next operator's work processes.

Then the sum of $X_7$ to $X_9$, which is $A_2$, is 49, and $A_2$ plus $X_{10}$ equals 72, which is larger than $A_{im}=71$. So that processes after $X_{10}$ are determined as the next operator's work processes.

Then, the sum of $X_{10}$ to $X_{14}$, which is $A_3$, is 63, and $A_3$ plus $X_{15}$ becomes 72, which is larger than $A_{im}=71$. So that processes after $X_{15}$ to $X_{21}$ are shared by three operators. In each work process, the rating multiplied values become 57, 62 and 67, respectively, as shown in FIG. 15. In this way, assigning work to each process so as to minimize the line balance loss can be determined as shown in FIG. 15. It is understood that each work process becomes 75 and the line balance loss becomes 0.

FIG. 16 is a table example showing a second calculation process of a production line balance considered most appropriate. This example shows how to calculate and minimize the line balance loss under the condition that the total number of works is 21 (n=21), the number of processes, such as M1, M2 and M3 is three (m=3), and each operator rating is $R_1=110$, $R_2=80$ and $R_3=95$, respectively. Each work man hours $X_1$, $X_2$, ... $X_{21}$ is as shown in FIG. 16, the total working man-hours X is 213, which is the sum of the man-hours of each process.

In this 2nd method, each operator shared man-hours $A_{im}$ is calculated by the following equation. $A_{im}=X\times R_i/(R_1+R_2+R_3)$ (m=1 to 3), where X is the sum of the man-hours of each process, $R_i$ is a rating of each process.

$$A_{i1}=213\times 110/(110+80+95)=82.2$$

$$A_{i2}=213\times 80/(110+80+95)=59.8$$

$$A_{i3}=213\times 95/(110+80+95)=71$$

Now, the sum $A_1$ of $X_1$ to $X_7$ is 80, and by multiplying $A_1$ by the rating, the value $80\times 100/110=72.7$ is obtained. Processes after $X_8$ are determined as the next operator's work processes. Then the sum of $X_8$ to $X_{10}$, which is $A_2$, is 52, and by multiplying $A_2$ by the rating, the value $54\times 100/80=67.5$ is obtained. Processes after $X_{11}$ are determined as the next operators' work processes.

The sum of $X_{11}$ to $X_{19}$, which is $A_3$, is 70, and by multiplying $A_3$ by the rating, the value $70\times 100/95=97.3$ is obtained. Last of all, the man-hours are shared by three operators. In this case, each work $X_{20}=3$ and $X_{21}=6$ is shared by M1 and M2 respectively, then calculate $A_1'=72.7+3=75.7$, $A_2'=67.5+6=73.5$ and $A_3'=73.7$. Accordingly, it is understood that sharing work to minimize line balance is as shown in FIG. 16.

FIG. 17A and FIG. 17B show each half part of a collection of display examples of work order sheets. These displays show work order sheets at an assembling site No. 1 at every tact interval, such as $t_0, t_1, \ldots, t_5$. In the drawings, although they are not shown, the displays at the assembling site No. 2 show the same displays as No. 1 after delaying one tact time interval; the displays at the assembling site No. 3 show the same displays as No. 2 after delaying one tact time interval.

The drawings indicate that products α and products β are to be assembled individually. The work contents for assembling the products α and β, and cautions are also displayed. And, if there is no work content, messages for work preparation and work end reports are shown on the screen.

FIG. 18A is a display example when faulty unit data of each product is input and FIG. 18B is a display example when the product error codes are input.

In FIG. 18A, operators input 00 when the test process is a basic process, 01 when the test process is an aging process, 02 when the test process is the last process. In the same way, corresponding codes pertaining to the temperature condition, voltage condition and impulse condition are input.

As shown in FIG. 18B, operators input error codes for each fault phenomenon through the fault information terminal by viewing the CRT screen connected with the fault information terminal.

FIG. 19A is a display example of a unit list for a product before replacing faulty units, FIG. 19B is a display example of a unit list for a product after replacing faulty units.

FIG. 19A displays the case when a 3.5 inch size floppy disk is determined a faulty disc at No. 6 unit product. In this case, when input 06 by operating the keyboard at the terminal, the data No. 6 is deleted from the disc of the line host controller.

FIG. 19B shows the screen after rewriting the lot number, the parts number of the semi-assembled product unit after repairing the semi-assembling unit by replacing the new unit for the fault unit No. 6.

As heretofore explained, according to the present invention, a versatile production system and methods for operating the same that can monitor the running condition of the system and diagnose abnormal conditions immediately are provided, thereby generating work order sheets for each operator reflecting the diagnostic results. Furthermore, the present invention provides a versatile production system and methods for operating the same that provide work order sheets so as to increase productivity and minimize tact balance loss for the production line corresponding to the work change command generated from the production control system; namely, the system automatically and swiftly generates the schedule file and the process base work file.

We claim:

1. A versatile production system for assembling parts into a product and testing the product, the versatile production system providing work orders, which indicate work assignments, where system data relates to at least one of work order control, progress control, schedule arrangement and product history, and fault data relates to at least one of the existence of faulty parts, the repair of faulty parts and the replacement of faulty parts, the versatile production system comprising:

an assembling site at which parts are assembled into a product;

a testing site to which an assembled product is transferred after being assembled at the assembling site, the assembled product being tested at the testing site and transferred from the testing site to a remote site;

at least two line terminals, one line terminal corresponding to and located at the assembling site and one line terminal corresponding to and located at the testing site;

a communication-memory unit which corresponds to a respective product and is transferred with the corresponding product, the communication-memory unit storing data relating to the corresponding product and communicating with a respective line terminal when the product is at an assembling site or testing site corresponding to the respective line terminal;

a line host controller which is electrically connected to the line terminals and communicates with the communication-memory unit via the line terminals to read data stored in the communication-memory unit and write data to the communication-memory unit;

a line host control terminal which is electrically connected to the line host controller, inputs system data to the line host controller and reads data from the line host controller; and a faulty product information terminal which is electrically connected to the line host controller and inputs fault data to the line host controller, wherein the line host controller electronically outputs data and work orders to the line terminals, the work orders based on the system data, fault data and data stored in the communication-memory unit.

2. A versatile production system as recited in claim 1, wherein system parameters include at least one of time control, quality conditions and states of operators and a respective caution level threshold value corresponds to each system parameter, said line host controller monitors each system parameter, compares each system parameter with the corresponding caution level threshold value and displays a caution notice when a respective system parameter is larger than the corresponding caution threshold value, the caution notice being displayed through said line terminals or said line host control terminal.

3. A versatile production system as recited in claim 1, wherein system parameters include at least one of time control, quality conditions and states of operators and a respective hazard level threshold value corresponds to each system parameter, said line host controller monitors each system parameter, compares each system parameter with the corresponding hazard level threshold value and displays a hazard notice when a respective system parameter is larger than the corresponding hazard level threshold value, the hazard level threshold value being displayed through said line terminal or said line host control terminal, said line host controller rearranges work assignments by outputting work orders in response to the display of a hazard level threshold value.

4. A versatile production system as recited in claim 1, wherein system parameters include at least one of time control, quality conditions and states of operators and a respective critical fault level threshold value corresponds to each system parameter, said line host controller monitors each system parameter, compares each system parameter with the corresponding critical fault level threshold value and, when a system parameter is larger than the corresponding critical threshold value, causes assembling of products to be stopped and reassigns work assignments via work orders output to said line terminals.

5. A versatile production system as recited in claim 1, wherein a time control parameter relates to the time at which work is performed and the time at which a product is transferred, said line host controller calculates the time control parameter based on data stored in said communication-memory unit and read by said line host controller via said line terminals.

6. A versatile production system as recited in claim 1, wherein a quality condition parameter relates to the quality of a product being assembled and tested, said line host controller calculates the quality condition parameter based on one of data stored in said communication-memory unit and read by said line host controller via said line terminals and fault data input to said line host controller via said faulty product information terminal.

7. A versatile production system as recited in claim 1, wherein a respective operator is located at each of the assembling site and the testing site, each operator having a working condition, operator states indicate the working condition of a respective operator and parameters relate to the operator states, the versatile production system further comprising sensors installed at said assembling site and said testing site and a programmable controller which is electrically connected to the sensors and controllers the sensors, said sensors providing signals which are electronically transferred to said line host controller, the parameters being calculated from the sensor signals.

8. A versatile production system as recited in claim 1, wherein the versatile production system operates according to system parameters which include data relating to at least one of the group comprising time control, quality conditions and state of operators, a respective caution level threshold value corresponds to each system parameter and a caution notice indicates that a system parameter is above the corresponding caution level threshold value, the line host controller monitors each of the system parameters, compares each parameter with the corresponding caution level threshold value and provides the caution notice when a respective parameter is larger than the corresponding caution threshold value, the caution notice being provided through one of the group comprising each of the line terminals and the line host control terminal.

9. A versatile production system as recited in claim 1, wherein the versatile production system operates according to system parameters which include data relating to at least one of the group comprising time control, quality conditions and state of operators for running conditions, a respective hazard level threshold value corresponds to each system parameter and a hazard notice indicates that a system parameter is above the corresponding hazard level threshold value, the line host controller monitors each of the system parameters, compares each parameter with the corresponding hazard level threshold value and provides the hazard notice when a respective parameter is larger than the corresponding hazard threshold value, the hazard notice being provided through one of the group comprising each of the line terminals and the line host control terminal, the line host controller outputting work orders to rearrange work assignments in accordance with the comparison of the system parameters with the respectively corresponding hazard threshold values.

10. A versatile production system as recited in claim 9, wherein at least one operator is positioned at the assembling site and at least one operator is positioned at the testing site, each operator having a corresponding efficiency rating, and the work assignments are rearranged by the line host controller in accordance with the efficiency ratings of each operator by changing work man-hours for each operator and the number of operators at the assembling site and the testing site.

11. A versatile production system as recited in claim 1, wherein the versatile production system operates according to system parameters which include data relating to at least one of the group comprising time control, quality conditions and state of operators, and a respective critical fault level threshold value corresponds to each system parameter, the line host controller monitors each of the system parameters, compares each parameter with the corresponding critical fault level threshold value and, when a respective parameter is larger than the corresponding critical fault threshold value, causes assembling of products to be stopped and outputs work orders indicating new work assignments.

12. A versatile production system as recited in claim 1, wherein the product is transferred on a pallet and the communication-memory unit is attached to the pallet.

13. A versatile production system as recited in claim 1, wherein the communication-memory unit is attached to the product.

14. A versatile production system for assembling parts into a product and testing the product, the versatile production system providing test result reports and work orders, where test result reports indicate test data for a product that has been tested and work orders indicate work assignments which are assigned so as to reduce the inefficient use of time, system data relates to at least one of work order control, progress control, schedule arrangement and product history and line host controller data is data stored in the line host controller and relates to at least one of work contents, operators, time changes, standard parts feeding sequence, components of a product and maintenance tools, the versatile production system comprising:

an assembling site at which parts are assembled into a product;

a testing site to which an assembled product is transferred after being assembled at the assembling site, the assembled product being tested at the testing site to determine if the product is non-defective and then transferred to a remote site;

at least two line terminals, one line terminal corresponding to and located at the assembling site and one line terminal corresponding to and located at the testing site;

a communication-memory unit which corresponds to a respective product and is transferred with the corresponding product, the communication-memory unit storing data relating to the corresponding product and communicating with a respective line terminal when the product is at an assembling site or testing site corresponding to the respective line terminal;

a line host controller which is electrically connected to the line terminals, stores line host controller data and communicates with the communication-memory unit via the line terminals to read data stored in the communication-memory unit and write data to the communication-memory unit;

a line host control terminal which is electrically connected to the line host controller, inputs system data to the line host controller and reads data from the line host controller;

wherein the line host controller electronically outputs data, work orders and test result reports to the line terminals, the work orders based on the system data, line host controller data and data stored in the communication-memory unit, and the test result reports are provided for products determined to be non-defective at the testing site.

15. A versatile production system as recited in claim 14, wherein fault data relates to at least one of the existence of faulty parts, the repair of faulty parts and the replacement of faulty parts, the versatile production system further comprising a faulty product information terminal which is electrically connected to the line host controller and inputs fault data to the line host controller.

16. A versatile production system as recited in claim 14, wherein a schedule file records work start data, type code, product name, product number, work sequence and work start time data, and a process base work file indicates which product should be produced, the time at which work should be started, and the type of work that should be executed, said line host controller maintains the schedule file and the process base work file and outputs work orders via the line terminals and based on the schedule file and the process base work file, to thereby reduce inefficient use of time.

17. A versatile production system as recited in claim 14, wherein a respective operator is positioned at each of the assembling site and the testing site, each operator is assigned work in the form of a process required to make a product, each process requiring a specific number of corresponding work steps from the respective operator, each work step requiring a specific number of man-hours by the respective operator to complete, total work man-hours is the sum of man-hours of each work step in a corresponding process, the number of processes corresponds to the number of operators and each operator has a corresponding efficiency rating, the line host controller outputs work orders to reduce inefficient use of time by calculating an average value by dividing the total work man-hours by the number of processes, and multiplying, for each operator, the corresponding total work man-hours by the efficiency rating corresponding to the respective operator to thereby render the work man-hours for each process equal to or less than the average value.

18. A versatile production system as recited in claim 14 wherein a respective operator is positioned at each of the assembling site and the testing site, each operator is assigned work in the form of a process required to make a product, each operator has a corresponding efficiency rating, and total work man-hours is the sum of man-hours required of the operator to complete the process, the line host controller outputs work orders so as to reduce inefficient use of time by determining intended assigned man-hours corresponding to each operator by dividing the total work man-hours by the sum of the efficiency ratings of each operator, multiplying the result by the efficiency rating corresponding to the respective operator, and then assigning work to each operator so as to render the work man-hours for each process equal to or less than the corresponding intended assigned man-hours.

19. A versatile production system as recited in claim 17, wherein remaining work represents work that was not assigned to an operator and the line host controller assigns the remaining work so that the total work man-hours for each operator becomes substantially equal.

20. A versatile production system as recited in claim 18, wherein remaining work represents work that was not assigned to an operator and the line host controller assigns the remaining work so that the total work man-hours for each operator becomes substantially equal.

21. A versatile production system as recited in claim 14, wherein the product is transferred on a pallet and the communication-memory unit is attached to the pallet.

22. A versatile production system as recited in claim 14, wherein the communication-memory unit is attached to the product.

* * * * *

UNITED STATES PATENT AND TRADEMARK OFFICE
CERTIFICATE OF CORRECTION

PATENT NO. : 5,396,432
DATED : March 7, 1995
INVENTOR(S) : Nobuo SAKA, et al.

It is certified that error appears in the above-indentified patent and that said Letters Patent is hereby corrected as shown below:

Col. 1, line 26, after "Also", insert --, when--.

Col. 17, line 61, delete "(3)".

Col. 18, line 6, insert --(3)-- (flush right).

Signed and Sealed this

Sixth Day of June, 1995

Attest:

BRUCE LEHMAN

*Attesting Officer*     *Commissioner of Patents and Trademarks*